United States Patent [19]

Steinberg et al.

[11] Patent Number: 5,365,433
[45] Date of Patent: Nov. 15, 1994

[54] SYSTEM FOR AUTOMATICALLY PROGRAMMING A FUNCTIONAL DATABASE

[76] Inventors: Geoffrey D. Steinberg, 1928 Carlton Dr.; Robert H. Faley, 6212 Third Avenue, both of, Kent, Ohio 44240

[21] Appl. No.: 919,707

[22] Filed: Jul. 24, 1992

[51] Int. Cl.⁵ ............................................. G06F 15/38
[52] U.S. Cl. ..................... 364/419.08; 364/419.07
[58] Field of Search ............. 364/419, 419.08, 419.07, 364/419.06

[56] References Cited

U.S. PATENT DOCUMENTS

| | | | |
|---|---|---|---|
| 4,558,413 | 12/1985 | Schmidt et al. | 364/221 |
| 4,622,633 | 11/1986 | Ceccon et al. | 364/221.9 |
| 4,829,423 | 5/1989 | Tennant et al. | 364/419 |
| 4,914,590 | 4/1990 | Loatman et al. | 364/419 |
| 4,920,499 | 4/1990 | Skeirik | 364/221.9 |
| 4,989,132 | 1/1991 | Mellender et al. | 364/274 |
| 5,084,817 | 1/1992 | Kumano et al. | 364/419 |
| 5,101,345 | 3/1992 | MacPhail | 364/222.8 |

Primary Examiner—Roy N. Envall, Jr.
Assistant Examiner—Ari M. Bai
Attorney, Agent, or Firm—Calfee, Halter & Griswold

[57] ABSTRACT

A system for automatically programming a functional database from a string of natural language words which form a substantially grammatically complete sentence is provided. The system includes a terminal and a processing unit. The processing unit includes an editor, a parser, and a database generator. Initially, a user inputs a string of words at the terminal. Next, the parser determines if the string of words includes a subject noun, a verb, and at least one descriptive noun following the verb. The parser then analyzes the string of words to determine the relationship among the words and generates a logical schema. Finally, the database generator programs a database containing a file and at least one field in the file in accordance with the logical schema.

22 Claims, 25 Drawing Sheets

SYSTEM FOR AUTOMATICALLY PROGRAMMING A FUNCTIONAL DATABASE

FIELD OF THE INVENTION

The present invention relates to a system for automatically programming a functional database. More particularly, the present invention relates to a system for automatically programming a functional database from a string of natural language words which form a substantially grammatically complete sentence. The string of words includes a subject noun, a verb, and at least one descriptive noun following the verb. A parser analyzes the string of words to determine the relationship among the words and generates a logical schema. A database generator then programs a database in accordance with the logical schema generated by the parser and the programs necessary to manipulate and maintain the database.

BACKGROUND OF THE INVENTION

The development of software typically goes through a life cycle that includes a number of stages. These stages are: (1) analysis, (2) design, (3) development, and (4) operation and maintenance. In the analysis stage, the end user and the system analyst work together to determine the data and functional requirements of the software. After this has been accomplished, the system analyst designs the software (design stage) and then a programmer generates the code for the software (development stage). Assuming that the software satisfies the end user's requirements, the software enters the final stage of the cycle, operation and maintenance, where it remains throughout the life of the software.

If the software did not satisfy the end user's requirements or if the end user's requirements subsequently change, the software can be modified to attempt to satisfy the original requirements or to accommodate the changing requirements. Such a modification requires the involvement of the end user, the system analyst, and the programmer. The end user and the system analyst must go back to the analysis stage and determine why the software did not satisfy the original requirements and/or develop new requirements. Once again, the system analyst must design the software (design stage) and the programmer must generate the code for the software (development stage). This process could be repeated an indefinite number of times if there is a continued failure to satisfy the original requirements or if the requirements are continually changing.

As should be apparent from the foregoing discussion, the development of software can be extremely time consuming and expensive. The development cycle requires extensive interaction among the end user, the system analyst, and the programmer. At every stage of the cycle, there is the possibility of miscommunication, and therefore, error in the software. The cycle may have to be repeated an indefinite number of times before the software satisfies the requirements of the end user. Unfortunately, using past methods of developing software, the roles of the end user, the system analyst, and the programmer were critical to the development of the software and could not be eliminated. Applicants therefore believe that a need exists to reduce the complexity of the development cycle of software, particularly database software, preferably by eliminating the roles of the system analyst and the programmer.

SUMMARY OF THE INVENTION

The present invention reduces the complexity of the development cycle of software by eliminating the roles of the system analyst and the programmer. Generally, the present invention provides end users with a system for automatically programming a functional database from a string of natural language words which form a substantially grammatically complete sentence. Consequently, the end user need not have any training or experience as a system analyst or a programmer.

More particularly, the present invention provides users with a system that includes a terminal and a processing unit. The processing unit includes an editor, a parser, and a database generator. Initially, a user inputs a string of words at the terminal. Next, the parser determines if the string of words includes a subject noun, a verb, and at least one descriptive noun following the verb. The parser then analyzes the string of words to determine the relationship among the words and generates a logical schema. Finally, the database generator programs a database containing a file and at least one field linked together in accordance with the logical schema and the programs necessary to manipulate and maintain the database.

These and other features of the present invention are fully described and particularly pointed out in the claims. The following detailed description and accompanying drawings set forth in detail a few illustrative embodiments. However, these embodiments are indicative of but a few of the various ways in which the principles of the present invention may be employed.

DETAILED DESCRIPTION OF THE PREFERRED EMBODIMENT

Figures 1, 2:
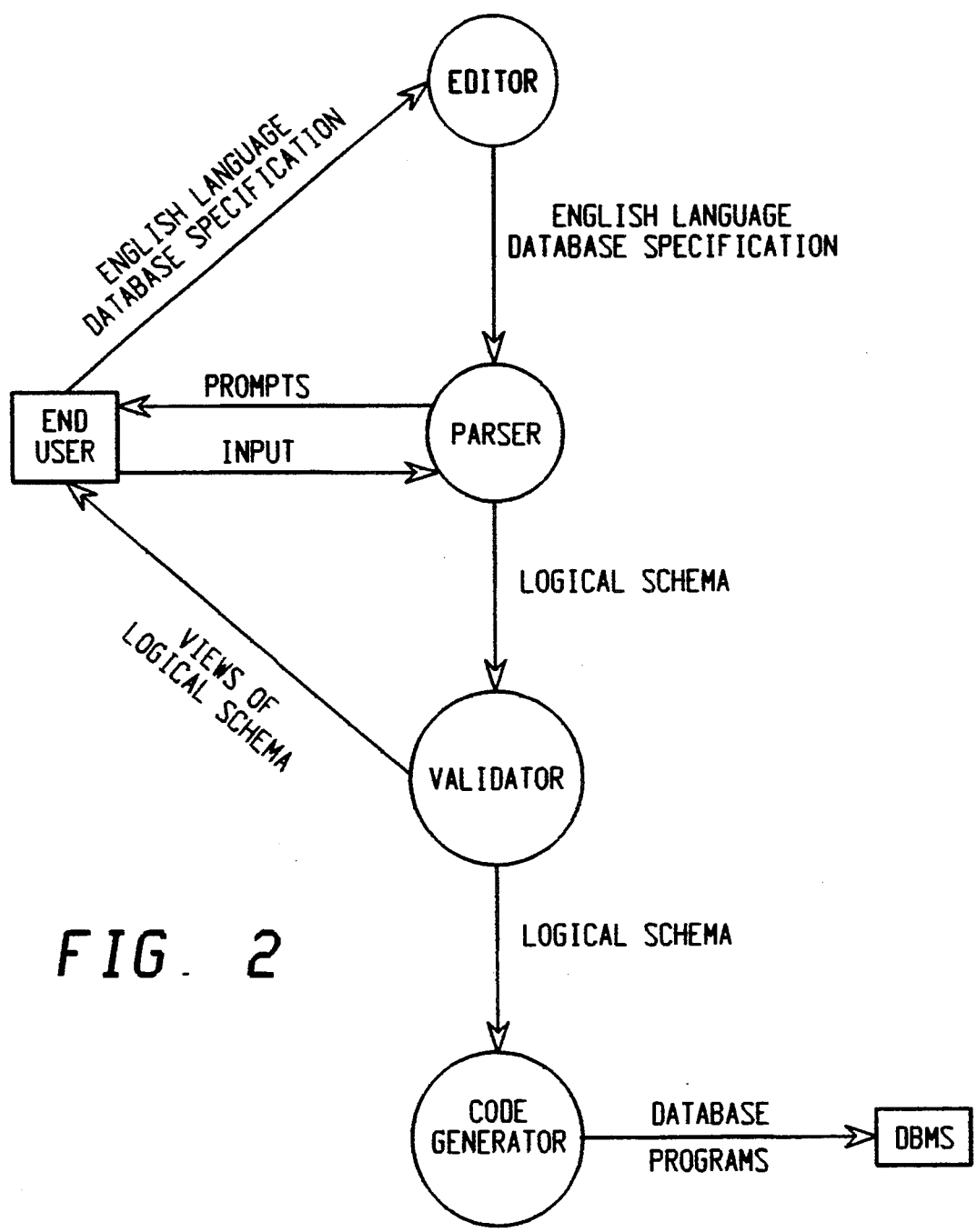
FIG. 1 is an overall view of the system of the present invention in its intended environment.
FIG. 2 is a schematic illustration of the software component of the system.

Referring now to the drawings and initially to FIG. 1, an overall view of the system of the present invention is shown in its intended environment. This system enables an end user who does not have any training or experience as a system analyst or a programmer to interface with a database management system (DBMS). Specifically, this system enables the end user to input a database specification in English sentences and automatically programs a functional database and the programs necessary to manipulate and maintain the database from these sentences.

The system includes a terminal and a processing unit. The terminal includes a keyboard and a display device. Both the keyboard and the display device are electrically connected to the processing unit. The keyboard receives the input data from the user and the display device displays the output data to the user. Furthermore, the processing unit includes a processor and a memory electrically connected to the processor. The software component of the system is stored in the memory and is executed in the processor.

FIG. 2 shows the software component of the system in greater detail. In particular, the software component includes an editor, a parser, a validator, and a code generator. Initially, the editor inputs the database specification in English sentences from the user at the terminal and displays the sentences to the user. Next, the parser receives the inputted sentences from the editor and determines if each sentence includes a subject noun, a verb, and at least one descriptive noun following the verb. The parser also analyzes the sentences to determine the relationship among the words and generates a logical schema. The validator then displays the generated logical schema to the user in any of five possible formats so that the user can determine if the logical schema satisfies the user's requirements. If the logical schema is satisfactory to the user, the code generator programs a database containing files and fields linked together in accordance with the logical schema and the programs necessary to manipulate and maintain the database.

A. Editor

Figure 3:
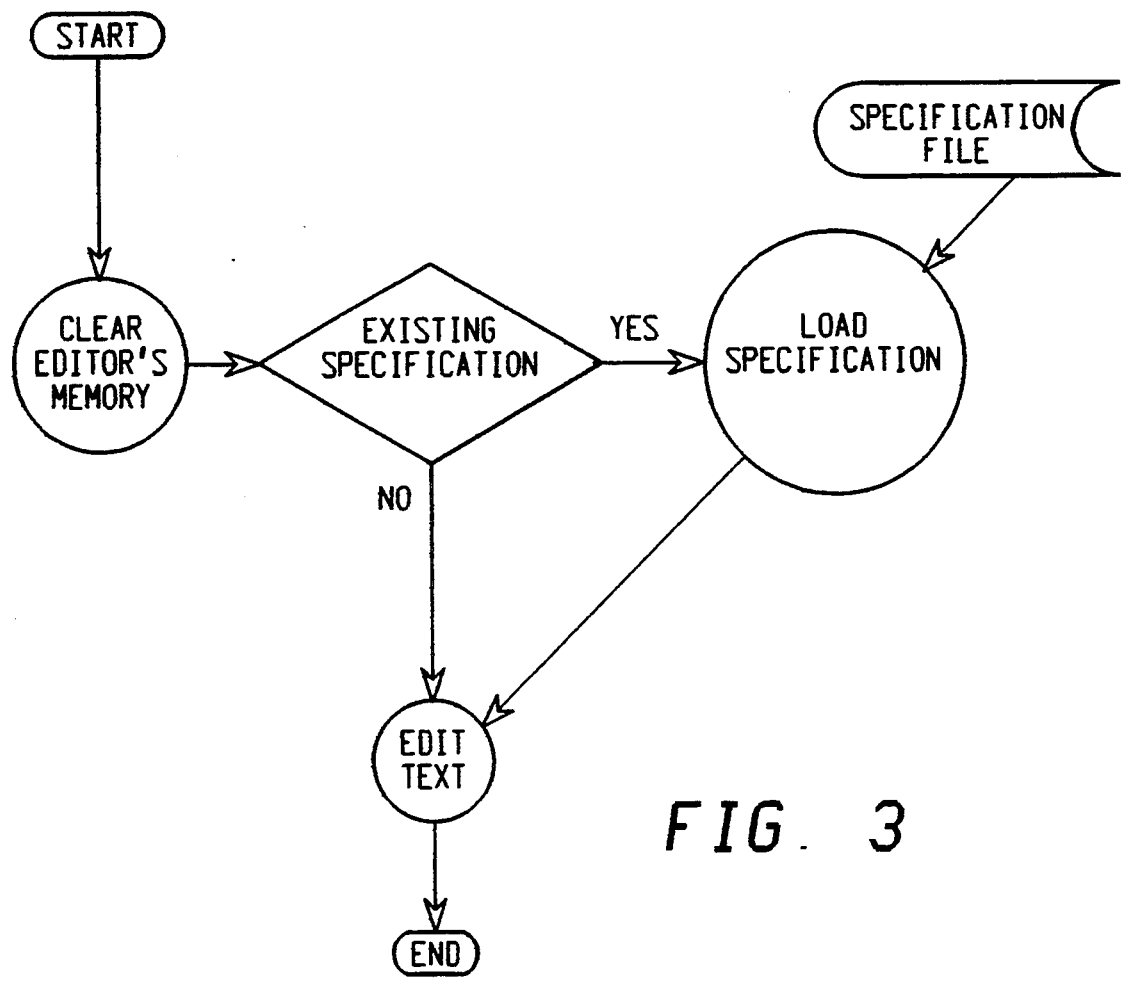
FIG. 3 is a flowchart illustrating the logic of the editor.
Figure 4:
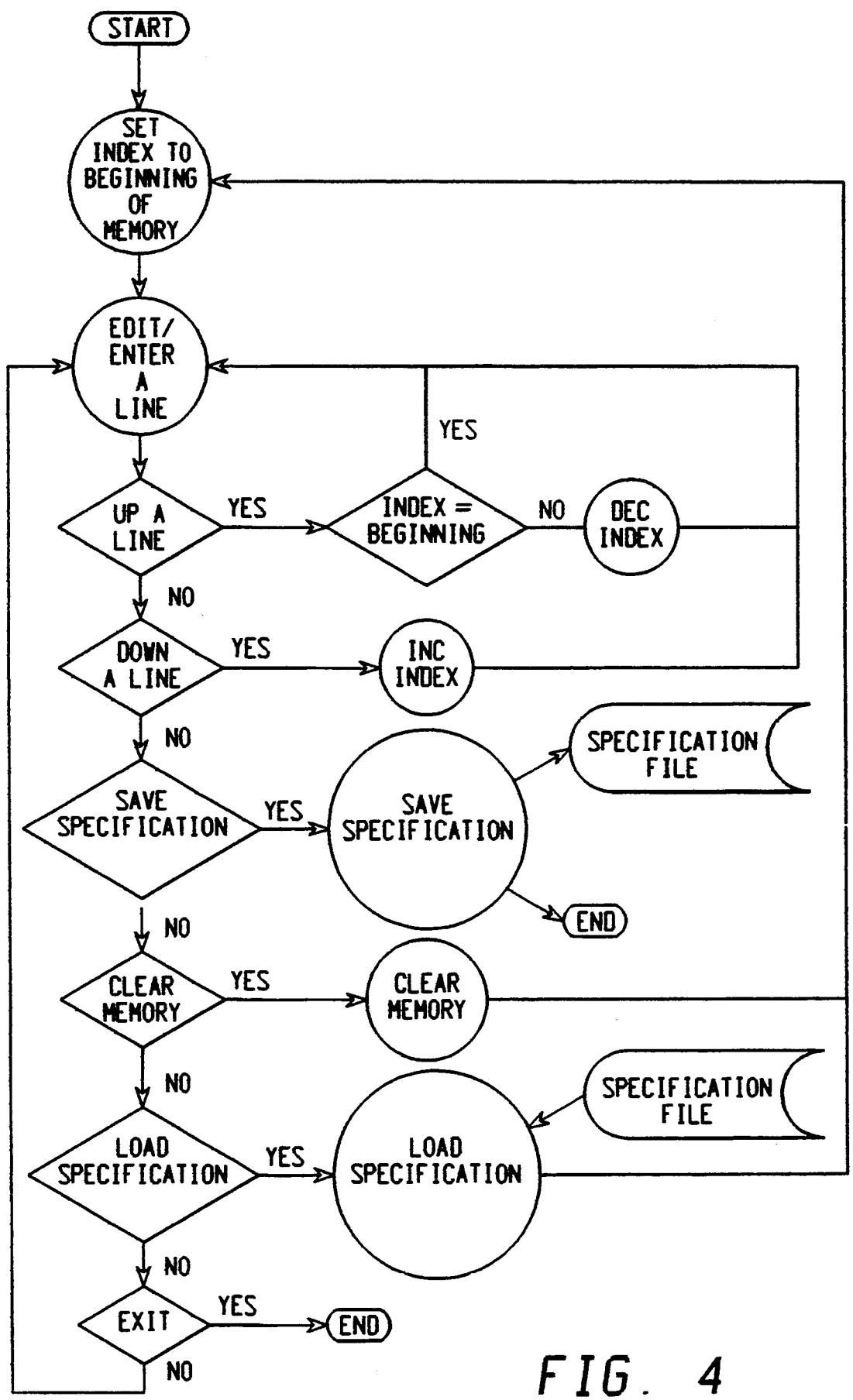
FIG. 4 is a flowchart illustrating the logic involved in editing the text.

The function of the editor is shown in greater detail in FIGS. 3 and 4. First, the editor clears the portion of the memory that is allocated to it. The user is then prompted to determine if there is an existing specification. If a specification already exists, it is loaded into the editor's memory. In either case, an index is set to the beginning of the editor's memory. At this point, the user can edit the existing specification or enter a new specification.

Besides editing or entering the text on a particular line, the user has six options. The user can go up a line, go down a line, save the edited or entered specification, clear the editor's memory, reload the existing specification, or exit. To go up a line, the editor determines if the index is at the beginning of the editor's memory. If the index is at the beginning of the memory, the editor stays on the same line; otherwise, the editor decrements the index. To go down a line, the editor increments the index. After decrementing or incrementing the index, respectively, the editor loops back up and allows the user to edit or enter the text on the new line. If the user wants to save the edited or entered specification, the contents of the editor's memory are stored in a non-volatile memory and the editor is exited. If the user wants to start over, the user can either clear the editor's memory or reload the existing specification. In either case, the editor resets the index to the beginning of the editor's memory and the user can begin editing or entering the specification. Lastly, the user can exit the editor.

B. Parser

Figure 5A:
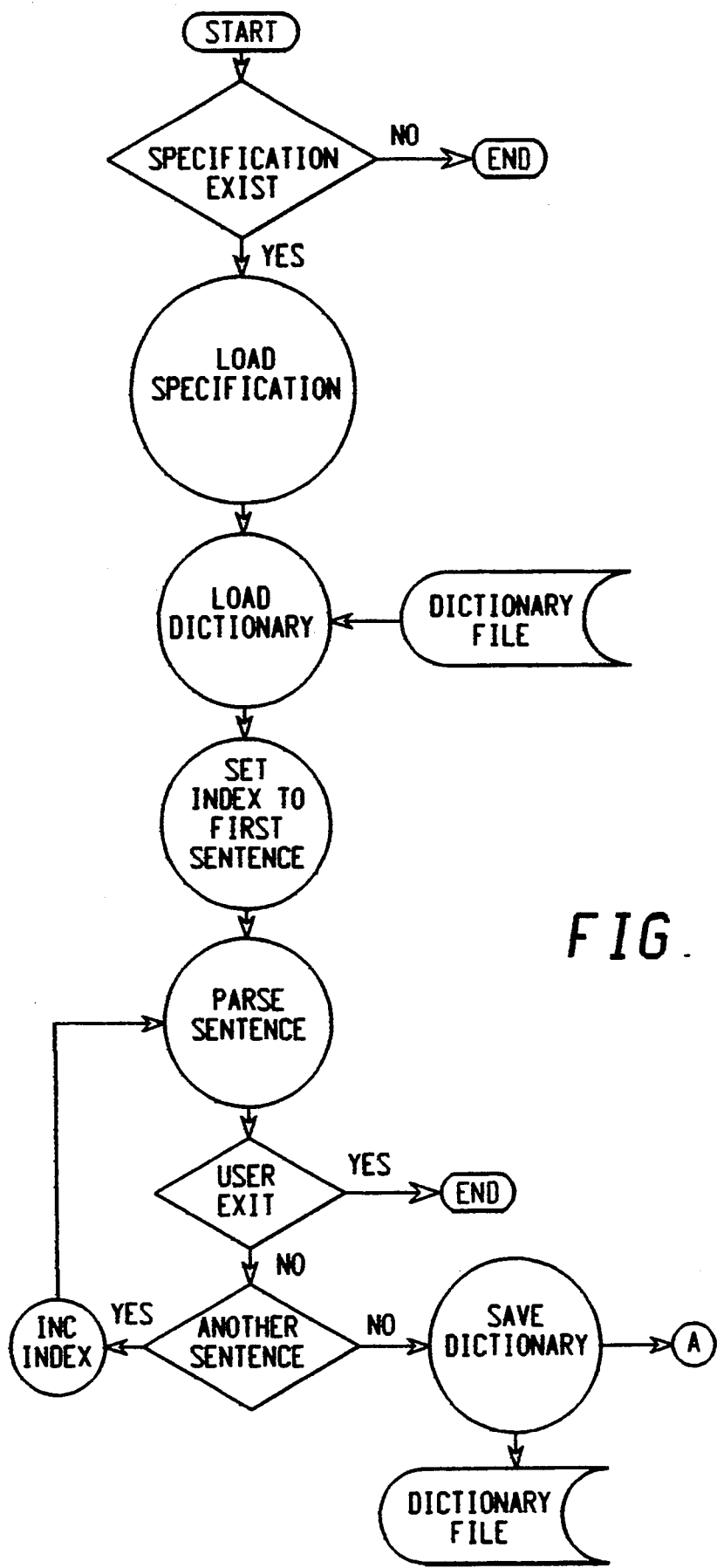
FIGS. 5a and 5b collectively form a flowchart illustrating the logic of the parser.
Figure 5B:
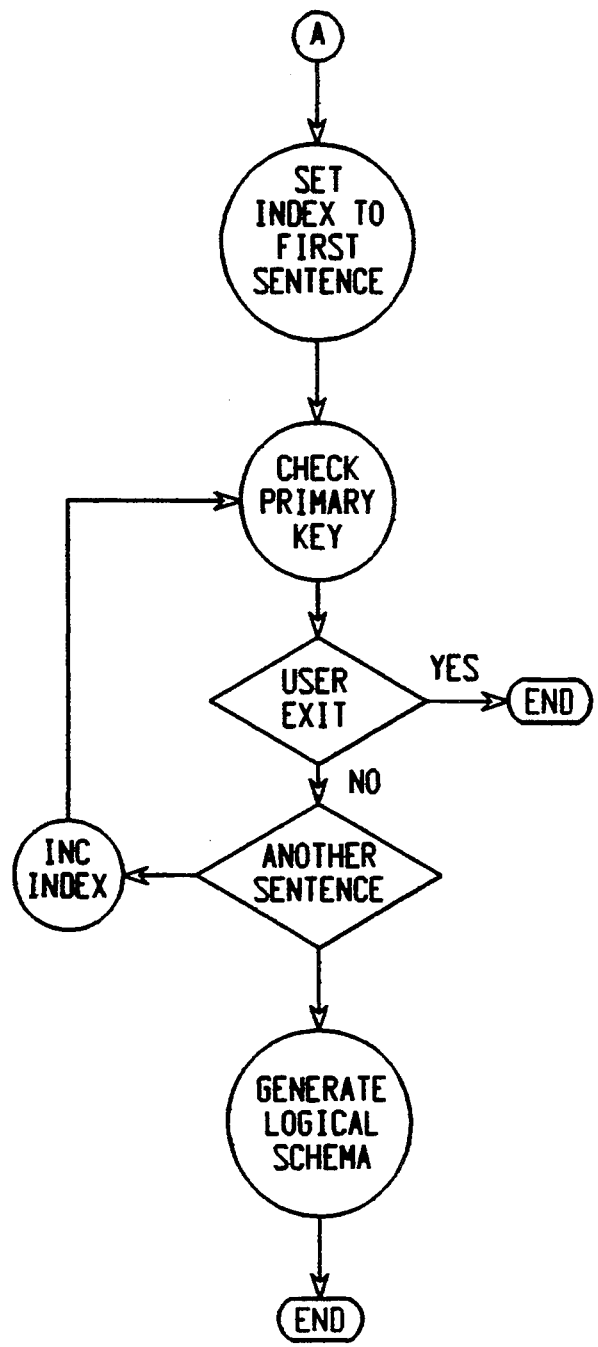

FIGS. 5a and 5b collectively show the function of the parser in greater detail. Initially, the parser determines if a specification exists. If a specification does not exist, the parser exits. Otherwise, the specification and a dictionary are loaded into the portion of the memory allocated to the parser. The dictionary contains a number of known words and their parts of speech. Next, an index is set to the first sentence in the specification and the sentence is parsed. After the sentence is parsed, the parser determines if the user wants to exit the parser. If the exit status key was set to true when the sentence was parsed, the parser is exited. Otherwise, the parser determines if there is another sentence in the specification. If there is another sentence, the index is incremented to the next sentence and the parser loops back up and parses the next sentence. This process is continued until the exit status key is set to true or until the last sentence has been parsed.

After the last sentence has been parsed, the dictionary (if it has been changed) is stored in the non-volatile memory and the index is reset to the first sentence in the specification. The parser then checks if the sentence has a primary key. After the sentence is checked, the parser determines if the user wants to exit the parser. If the exit status key was set to true when the primary key was checked, the parser is exited. Otherwise, the parser determines if there is another sentence in the specification. If there is another sentence, the index is incremented to the next sentence and the parser loops back up and checks the next sentence. This process is continued until the exit status key is set to true or until the last sentence has been checked. After the last sentence has been checked, the parser generates a logical schema from the parsed sentences and the parser is exited.

1. Load Specification

Figure 6:
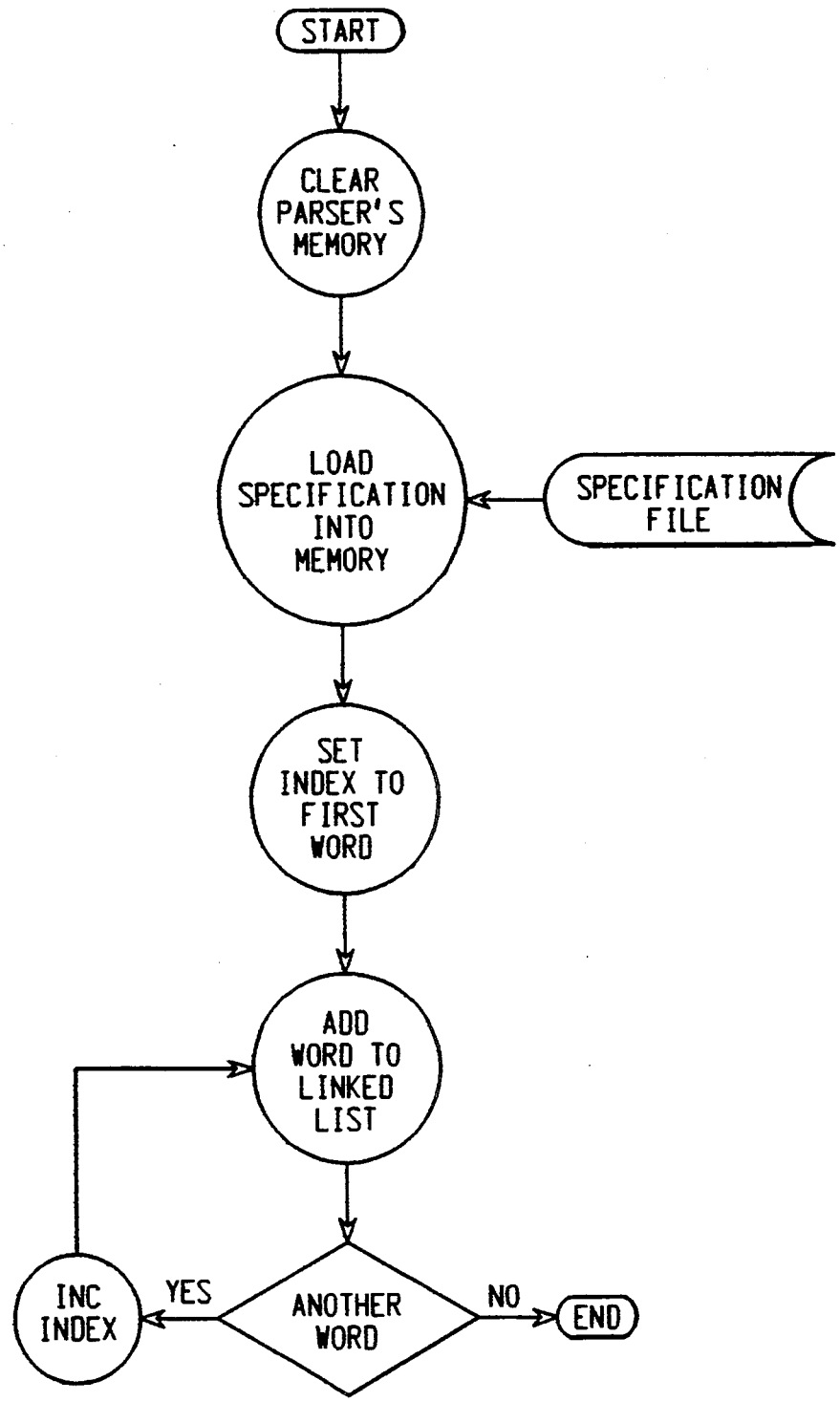
FIG. 6 is a flowchart illustrating the logic involved in loading a specification into the parser's memory.

The step of loading the specification into the parser's memory is shown in greater detail in FIG. 6. First, the parser's memory is cleared and the specification is loaded into the memory. Next, an index is set to the first word in the specification and the word is added to a linked list. The parser then determines if there is another word in the specification. If there is another word, the index is incremented to the next word and the parser loops back up and adds the next word to the linked list. This process is continued until the last word has been added to the linked list.

2. Parse Sentence

Figure 7:
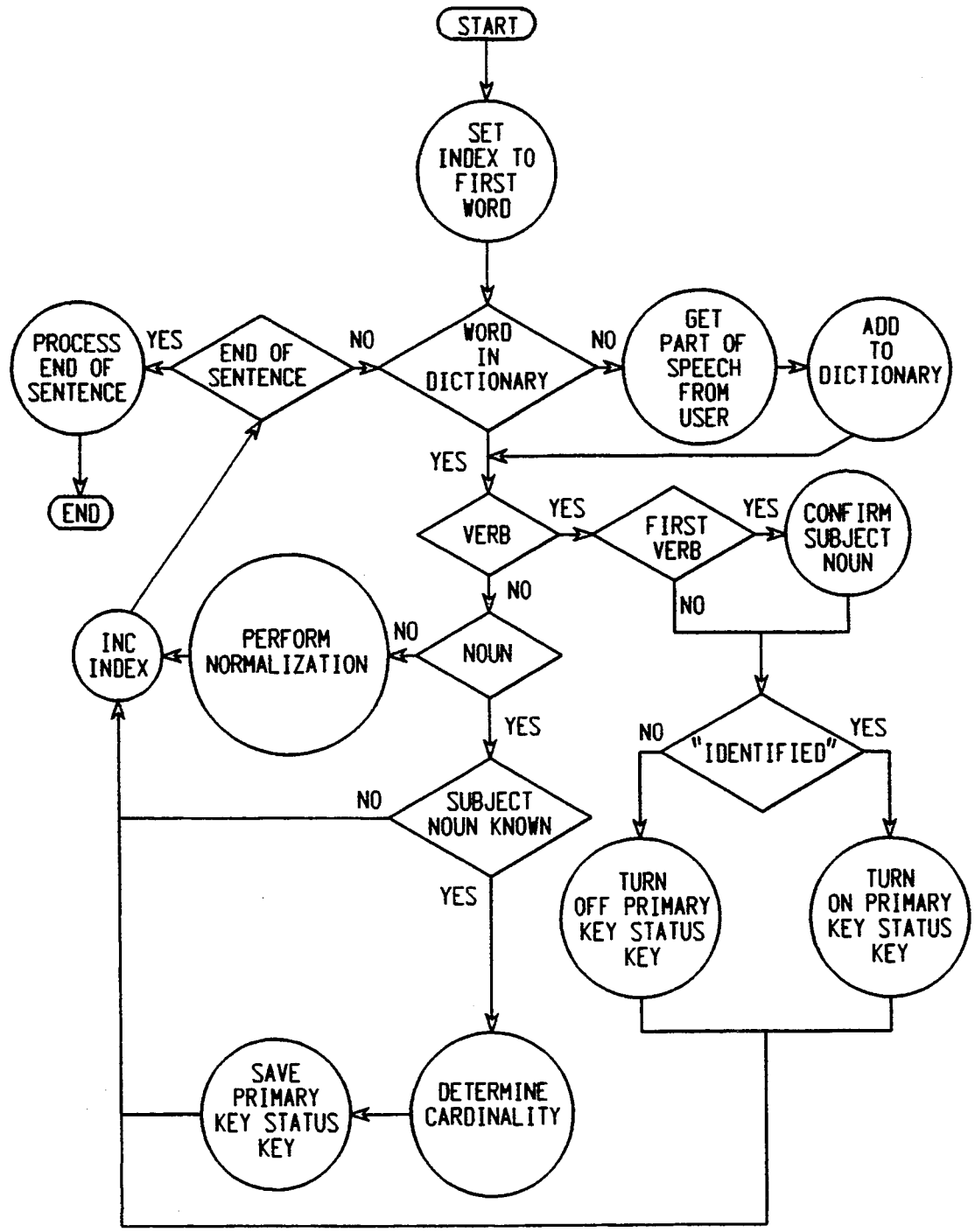
FIG. 7 is a flowchart illustrating the logic involved in parsing a sentence.

FIG. 7 shows the step of parsing a sentence in greater detail. Initially, an index is set to the first word in the sentence. Next, the parser determines if the word is in the dictionary. If the word is not in the dictionary, the parser prompts the user to input the part of speech of the word and adds the word and the inputted part of speech to the dictionary. The parser then determines if the word is a verb. If the word is a verb, the parser also determines if the word is the first verb in the sentence. If the word is the first verb in the sentence, the parser confirms the subject noun of the sentence. Regardless of whether the verb is the first verb in the sentence, the parser then determines if the verb is the word "identified". If the verb is the word "identified", the parser turns on the primary key status key. Otherwise, the parser turns off the primary key status key. If the word was not a verb, the parser determines if the word is a noun. If the word is a noun, the parser also determines if the subject noun of the sentence is known. If the subject noun of the sentence is known, the parser determines the cardinality and saves the primary key status of the word. Lastly, if the word was not a verb or a noun, the word is an "other" word and the parser performs normalization. After determining if the word is a verb, a noun, or an other word, and doing the respective processing based on that determination, the parser increments the index to the next word in the sentence and determines if it is at the end of the sentence. If it is not at the end of the sentence, the parser loops back up and processes the next word in the sentence. This process is continued until the end of the sentence is reached. After the end of the sentence is reached, the parser does the end of sentence processing.

a. Confirm Subject Noun

Figure 8:
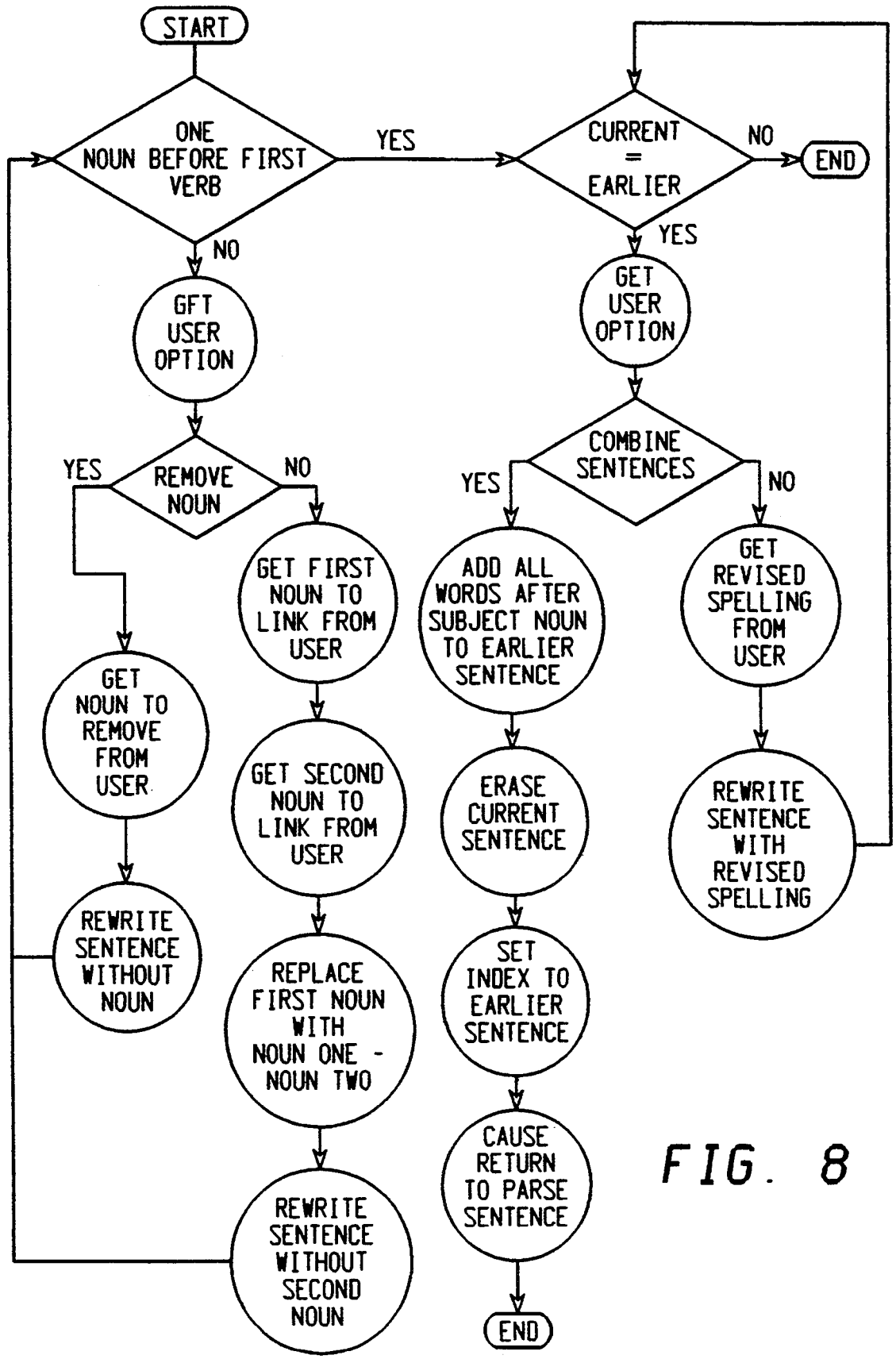
FIG. 8 is a flowchart illustrating the logic involved in confirming the subject noun.

The step of confirming the subject noun is shown in greater detail in FIG. 8. First, the parser determines if there is only one noun before the first verb. If there is more than one noun, the user has the option of selecting one of the nouns to be the subject noun or linking the nouns together to form the subject noun. If the user decides to select one of the nouns, the user is prompted to input the noun to remove and the sentence is rewritten without that noun. If the user decides to link the nouns together, the user is prompted to input the first noun and the second noun to link, the first noun is replaced with the combination of first noun-second noun, and the sentence is rewritten without the second noun.

Once there is only one noun before the first verb, the parser determines if the current subject noun is the same as the subject noun in an earlier sentence. If the subject noun is not the same, the subject noun is confirmed. If the subject noun is the same, the user has the option of combining the sentences or revising the subject noun in one of the sentences. If the user decides to combine the sentences, the parser adds all of the words after the subject noun in the current sentence to the earlier sentence and erases the current sentence. The sentence index is then set to the earlier sentence and the parser loops back up and reparses the earlier sentence. If the user decides not to combine the sentences, the user is prompted to input the revised spelling of the subject noun in one of the sentences and the sentence is rewritten with the revised spelling. After the spelling is corrected, the parser loops back up and redetermines if the revised subject noun is the same as the subject noun in an earlier sentence. This process is continued until the subject noun is different from the subject nouns in earlier sentences and the subject noun is confirmed.

b. Determine Cardinality

Figure 9:
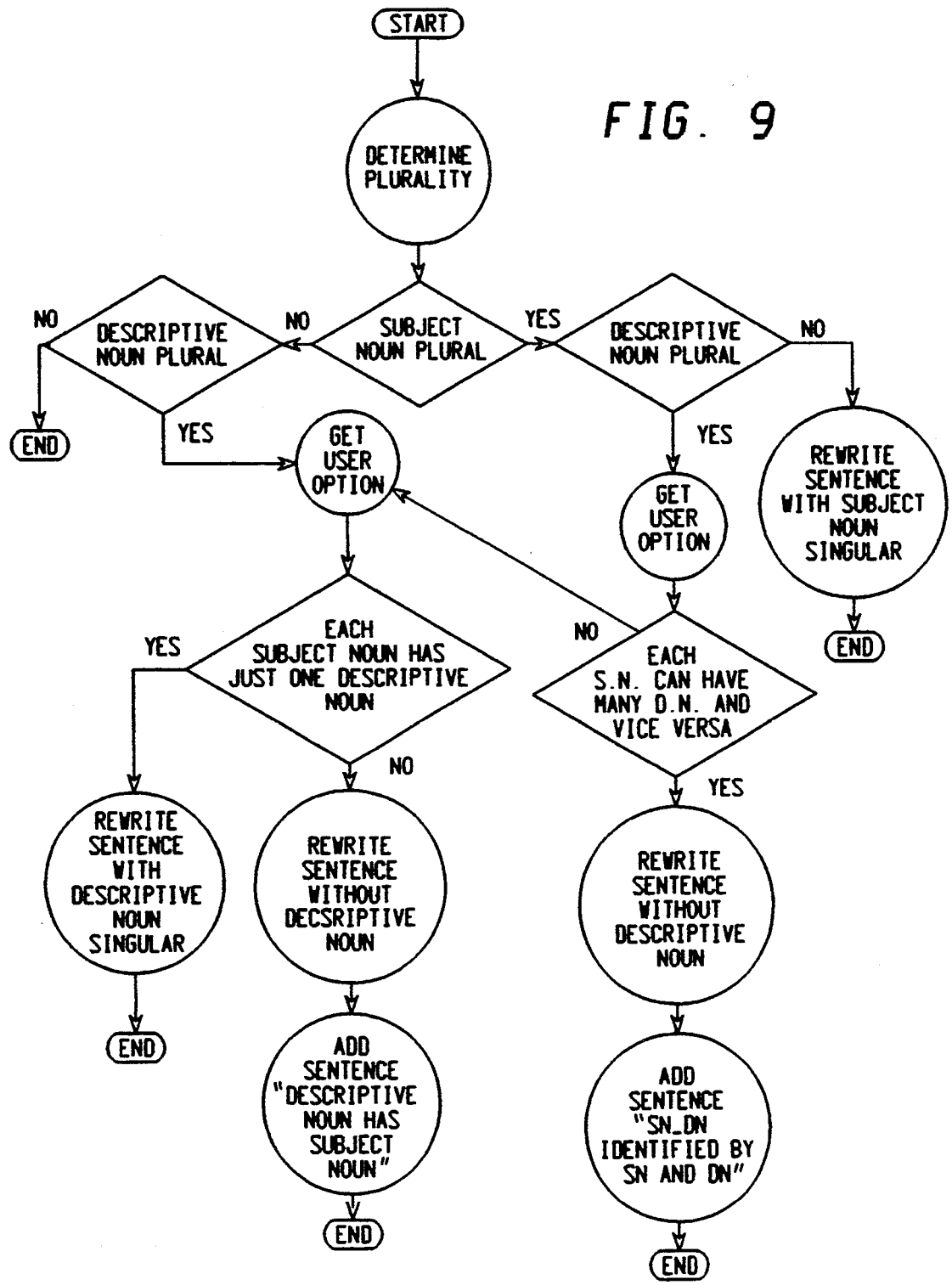
FIG. 9 is a flowchart illustrating the logic involved in determining cardinality.
Figure 10:
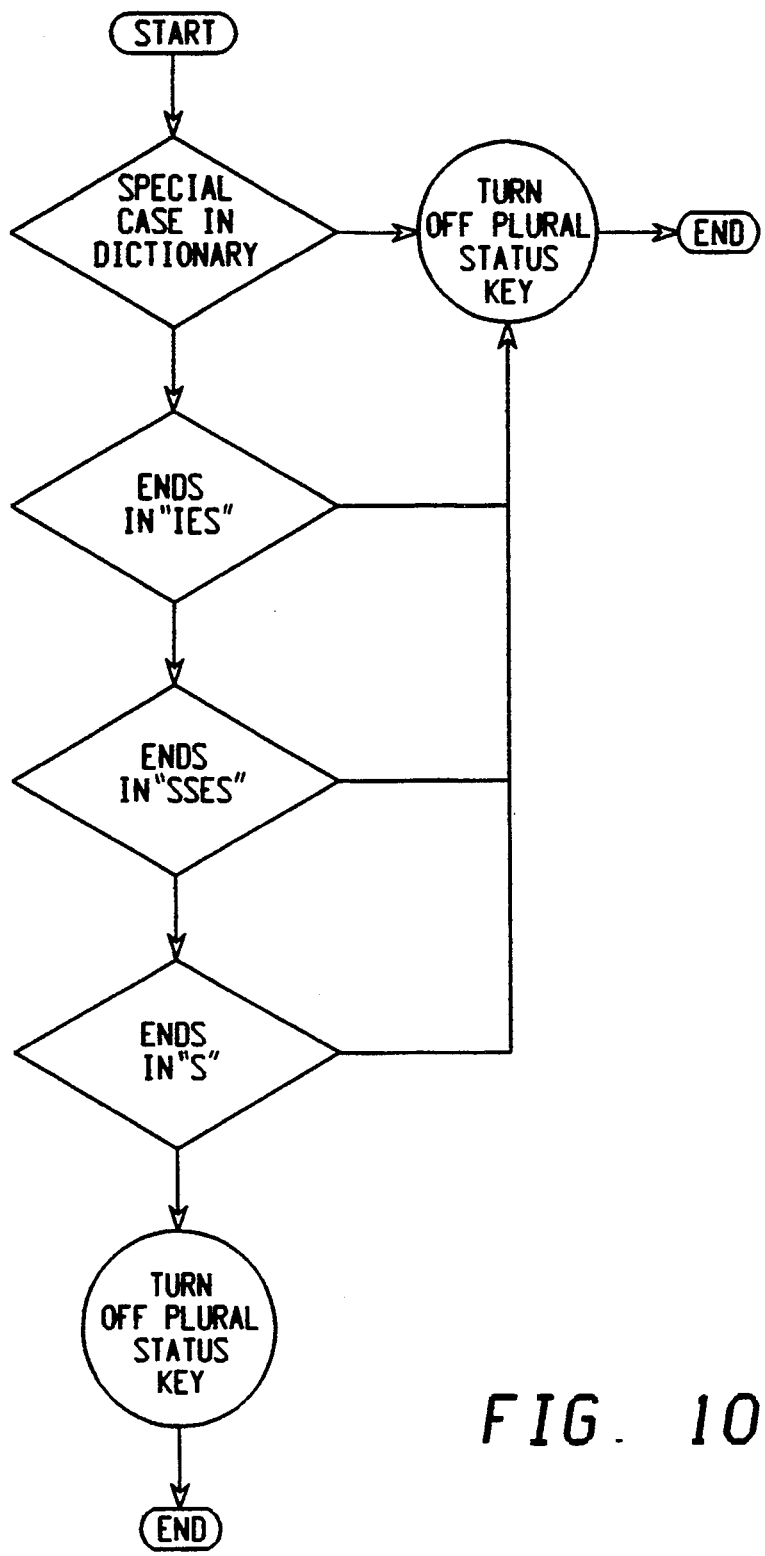
FIG. 10 is a flowchart illustrating the logic involved in determining plurality.

FIGS. 9 and 10 show the step of determining cardinality in greater detail. In a relational database, cardinality is a measure of the relationship between a pair of entities. More specifically, cardinality is a measure of the relationship between a given row in one entity and the number of rows in a second entity that are associated with the given row in the first entity. To determine cardinality, the parser initially determines the plurality of the subject noun and the descriptive noun. At this point, there are four possible cardinality outcomes. These outcomes are: (1) neither the subject noun nor the descriptive noun is plural, (2) the subject noun is not plural but the descriptive noun is plural, (3) both the subject noun and the descriptive noun are plural, and (4) the subject noun is plural but the descriptive noun is not plural. In the following discussion, hypothetical specifications will be given together with the cardinality outcome for the specifications.

If neither the subject noun nor the descriptive noun is plural, the parser does nothing and cardinality is established as 1:1. A hypothetical specification illustrating this outcome is "Patent identified by number has title, filingdate, and inventor." This sentence would remain unchanged.

If the subject noun is not plural but the descriptive noun is plural, the user is prompted to input whether each subject noun has just one of the descriptive noun or each subject noun can have many of the descriptive noun. If each subject noun has just one of the descriptive noun, the parser rewrites the current sentence with the descriptive noun made singular and cardinality is established as 1:1. If each subject noun can have many of the descriptive noun, the parser rewrites the current sentence without the descriptive noun and adds a new sentence after the current sentence stating that "descriptive noun has subject noun." In this case, cardinality is established as 1:M (where M means many).

A hypothetical specification illustrating this outcome is "Patent identified by number has title, filingdate, and inventors." The user would be prompted to input whether each patent has just one inventor or each patent can have many inventors. If the user input that each patent has just one inventor, the sentence would be rewritten as "Patent identified by number has title, filingdate, and inventor." Otherwise, if the user input that each patent can have many inventors, the sentence would be rewritten as "Patent identified by number has title and filingdate" and a new sentence would be added stating that "Inventor has patent."

If both the subject noun and the descriptive noun are plural, the user is prompted to input if each subject noun can have many of the descriptive noun and each descriptive noun can have many of the subject noun. If this statement is true, the parser rewrites the current sentence without the descriptive noun and adds a new sentence after the current sentence stating that "subject noundescriptive noun identified by subject noun and descriptive noun." In this case, cardinality is established as M:M. If this statement is not true, the user is prompted to input whether each subject noun has just one of the descriptive noun or each subject noun can have many of the descriptive noun. If each subject noun has just one of the descriptive noun, the parser rewrites the current sentence with the descriptive noun made singular and cardinality is established as 1:1. If each subject noun can have many of the descriptive noun, the parser rewrites the current sentence without the descriptive noun and adds a new sentence after the current sentence stating that "descriptive noun has subject noun." In this case, cardinality is established as 1:M.

A hypothetical specification illustrating this outcome is "Patents identified by number have title, filingdate, and inventors." The user would be prompted to input if each patent can have many inventors and each inventor can have many patents. If this statement is true, the sentence would be rewritten as "Patents identified by number have title and filingdate" and a new sentence would be added stating that "Patentinventor identified by patent and inventor." If this statement is not true, the user would be prompted to input whether each patent has just one inventor or each patent can have many inventors. If the user input that each patent has just one inventor, the sentence would be rewritten as "Patents identified by number have title, filingdate, and inventor." Otherwise, if the user input that each patent can have many inventors, the sentence would be rewritten as "Patents identified by number have title and filingdate" and a new sentence would be added stating that "Inventor has patent."

If the subject noun is plural but the descriptive noun is not plural, the parser rewrites the current sentence with the subject noun made singular and cardinality is established as M:1. A hypothetical specification illustrating this outcome is "Patents identified by number have title, filingdate, and inventor." This sentence would be rewritten as "Patent identified by number has title, filingdate, and inventor."

To determine if a word (i.e. the subject noun and/or the descriptive noun) is plural (see FIG. 10), the parser determines if the word (1) is one of the special cases listed in the dictionary, (2) ends in "ies," (3) ends in "sses," or (4) ends in "s." If the word falls in one of these categories, the parser turns on a plural status key. If the word does not fall in any of these categories, the parser turns off the plural status key.

c. Perform Normalization

Figure 11:
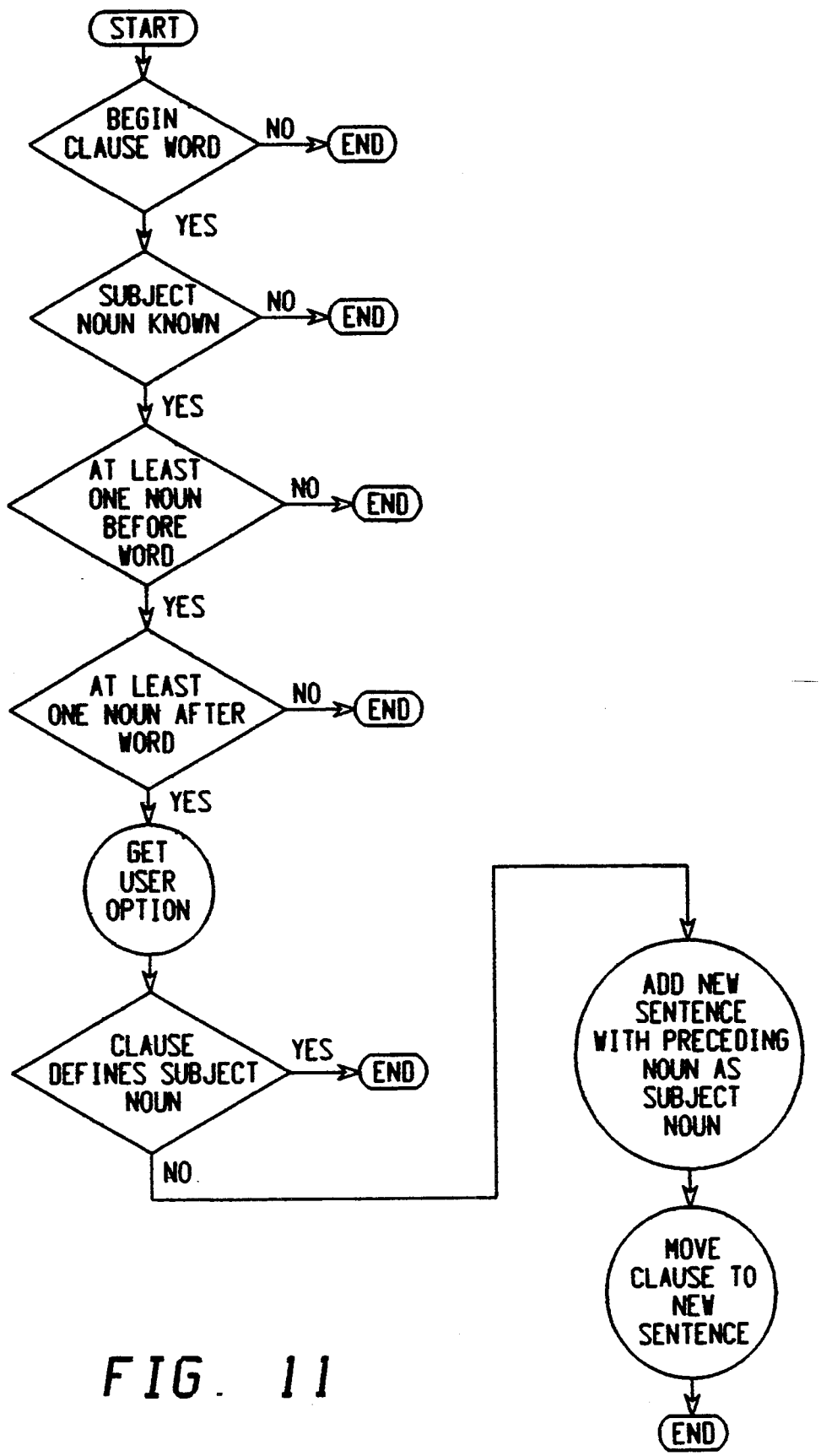
FIG. 11 is a flowchart illustrating the logic involved in performing normalization.

The step of performing normalization is shown in greater detail in FIG. 11. First, the parser determines if the word is a "begin clause" word, if the subject noun is known, if there is at least one noun between the subject noun and the begin clause word, and if there is at least one noun after the begin clause word. A "begin clause" word is a word that marks the beginning of a descriptive clause within a sentence. Examples of begin clause words are "who," "that," "which," "they," "he," and "she." If any one of these statements is not true, normalization does not need to be performed. Otherwise, if all of these statements are true, the user is prompted to input if the clause defines the subject noun. If the clause defines the subject noun, normalization does not need to be performed. If the clause does not define the subject noun, the parser adds a new sentence with the noun preceding the begin clause word as the subject noun and moves the clause to the new sentence. At this point, normalization has been performed.

d. Process End of Sentence

Figure 12:
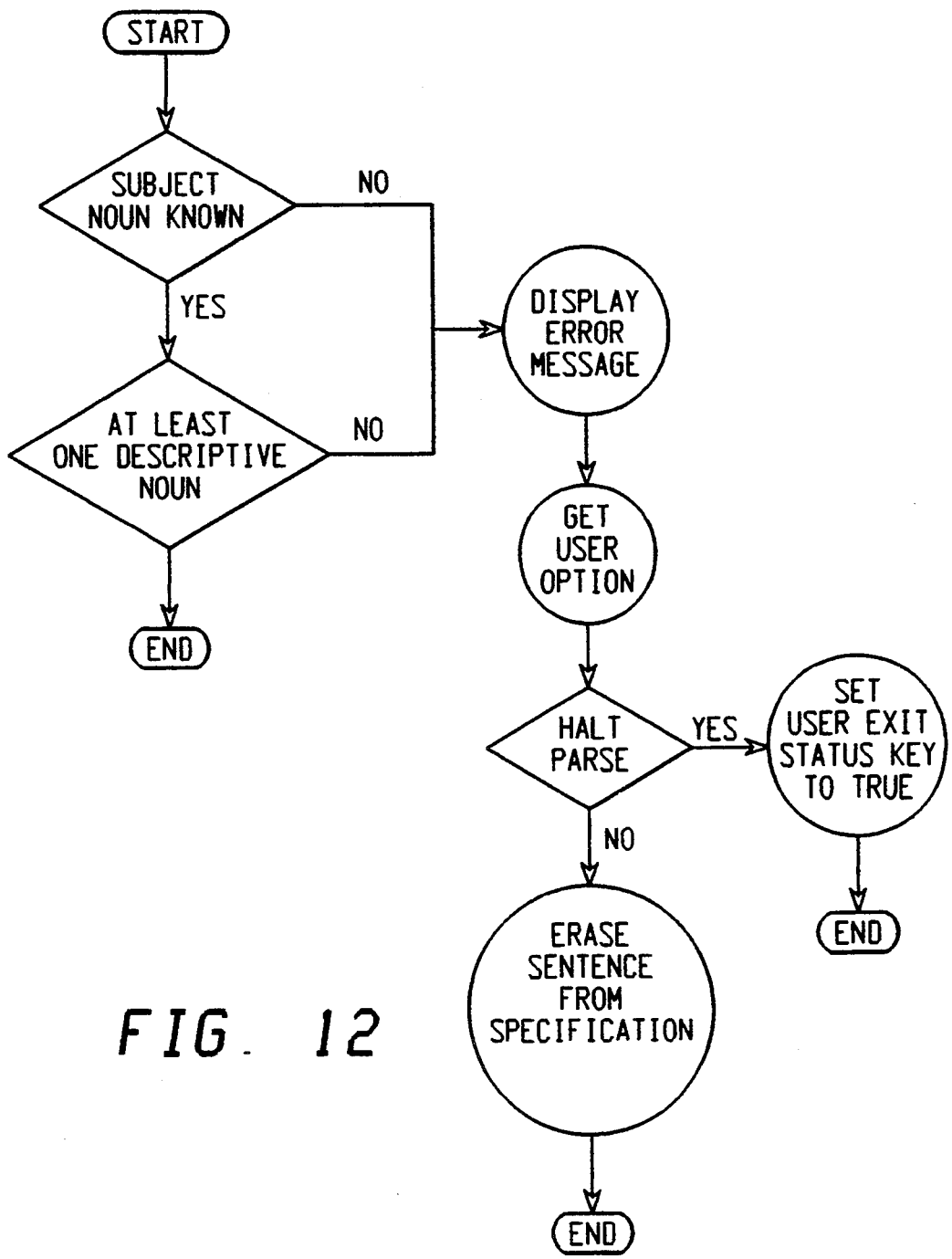
FIG. 12 is a flowchart illustrating the logic involved in the end of sentence processing.

FIG. 12 shows the step of processing the end of a sentence in greater detail. Initially, the parser determines if the subject noun is known and if there is at least one descriptive noun. If the subject noun is known and there is at least one descriptive noun, the sentence is in the proper format. If either the subject noun is not known or there is no descriptive noun, the parser displays an error message to the user and the user has the option of halting the parse or erasing the current sentence from the specification. If the user decides to halt the parse, the parser sets the user exit status key to true. Otherwise, the parser erases the current sentence from the specification and continues parsing the remaining sentences.

3. Check Primary Key

Figure 13:
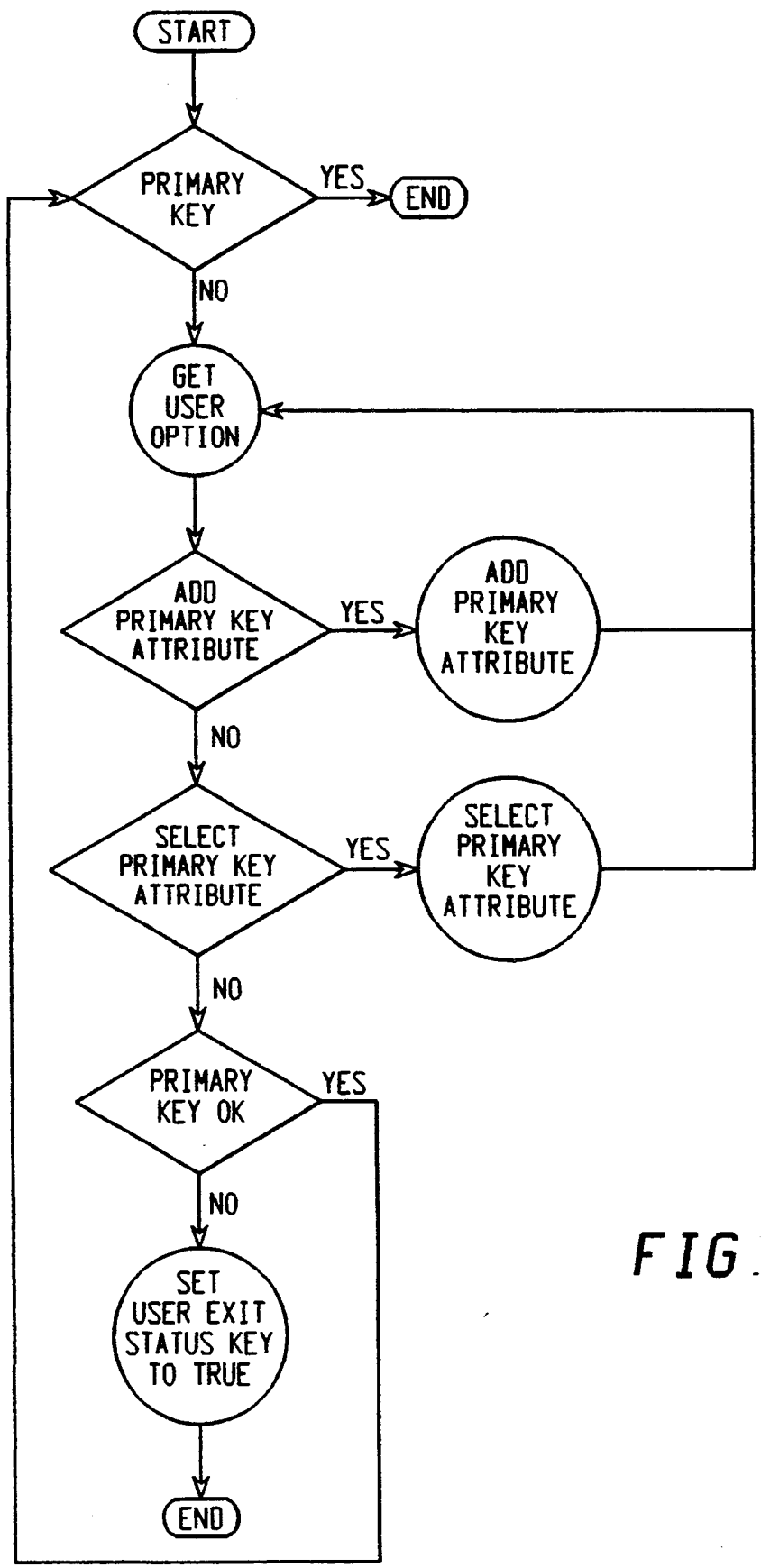
FIG. 13 is a flowchart illustrating the logic involved in checking for a primary key.
Figure 14:
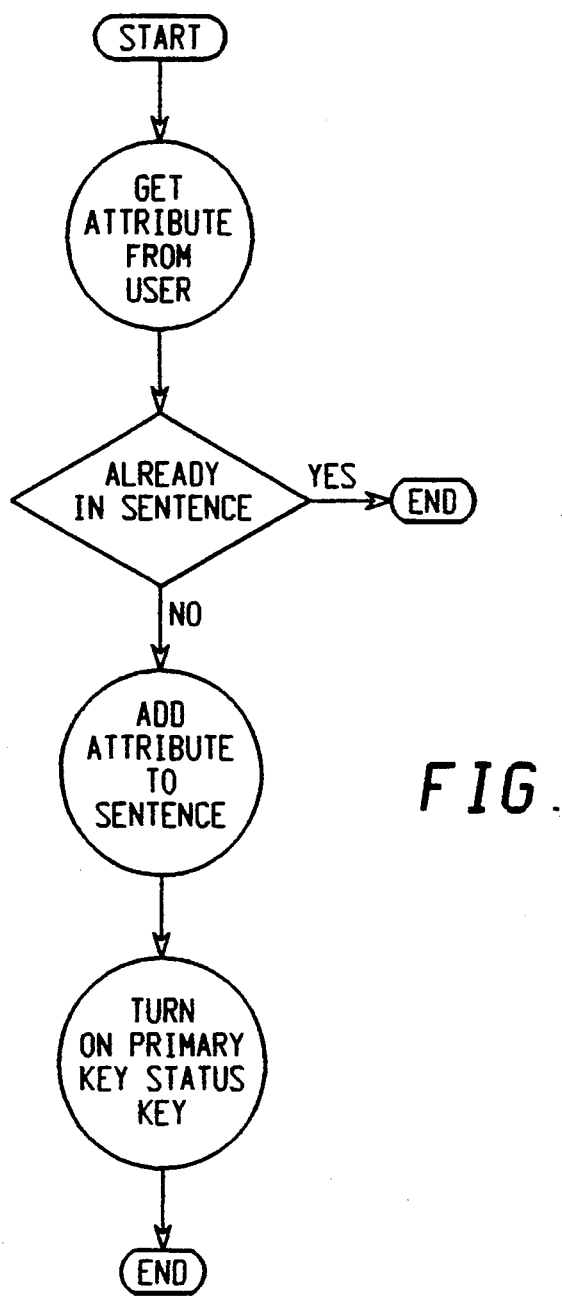
FIG. 14 is a flowchart illustrating the logic involved in adding a primary key attribute.
Figure 15:
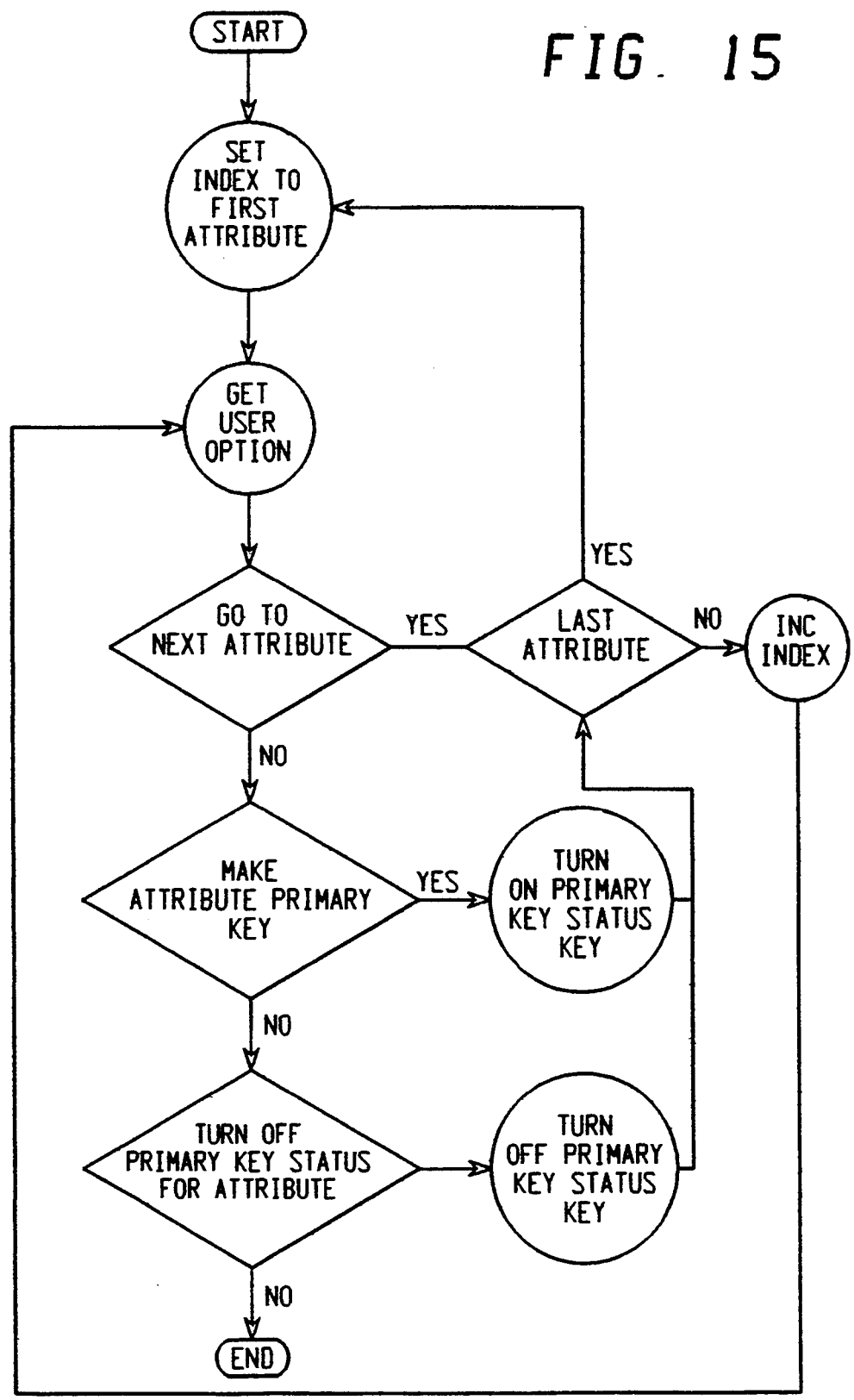
FIG. 15 is a flowchart illustrating the logic involved in selecting a primary key from the current attributes.

The step of checking the primary key is shown in greater detail in FIGS. 13, 14, and 15. First, the parser determines if at least one descriptive noun or a combination of descriptive nouns in the sentence is a primary key. If there is at least one such descriptive noun, the primary key has been identified. If there is no primary key, the user has the option of adding a primary key attribute, selecting a primary key from the current attributes, saying that the primary key is ok, and exiting the parser. If the user decides to add a primary key attribute or select a primary key from the current attributes, the parser adds or selects the key and then loops back up to get the user's next option. If the user says that the primary key is ok, the parser loops back up and redetermines if at least one descriptive noun or a combination of descriptive nouns in the sentence is a primary key. Lastly, if the user decides to exit the parser, the parser sets the user exit status key to true. The parser continues to give the user the four original options until there is a primary key or the user decides to exit the parser.

To add a primary key attribute (see FIG. 14), the parser prompts the user to input the new attribute. After inputting the attribute from the user, the parser determines if the attribute is already in the sentence. If the attribute is already in the sentence, the parser does nothing- Otherwise, the parser adds the attribute to the sentence and turns on the primary key status key for the attribute.

To select a primary key from the current attributes (see FIG. 15), the parser sets an index to the first attribute in the sentence. The user then has the option of going to the next attribute in the sentence, making the current attribute a primary key, or turning off the primary key status for the current attribute. If the user decides to go to the next attribute, the parser determines if it is at the last attribute in the sentence. If the parser is at the last attribute, it loops back up and sets the index to the first attribute in the sentence. Otherwise, it increments the index to the next attribute in the sentence and loops back up to get the user's next option. If the user decides to make the current attribute a primary key, the parser turns on the primary key status key for the current attribute and goes to the next attribute. Lastly, if the user decides to turn off the primary key status for the current attribute, the parser turns off the primary key status key for the current attribute and goes to the next attribute. The parser continues to give the user the three original options until the user decides to exit.

4. Generate Logical Schema

Figure 16:
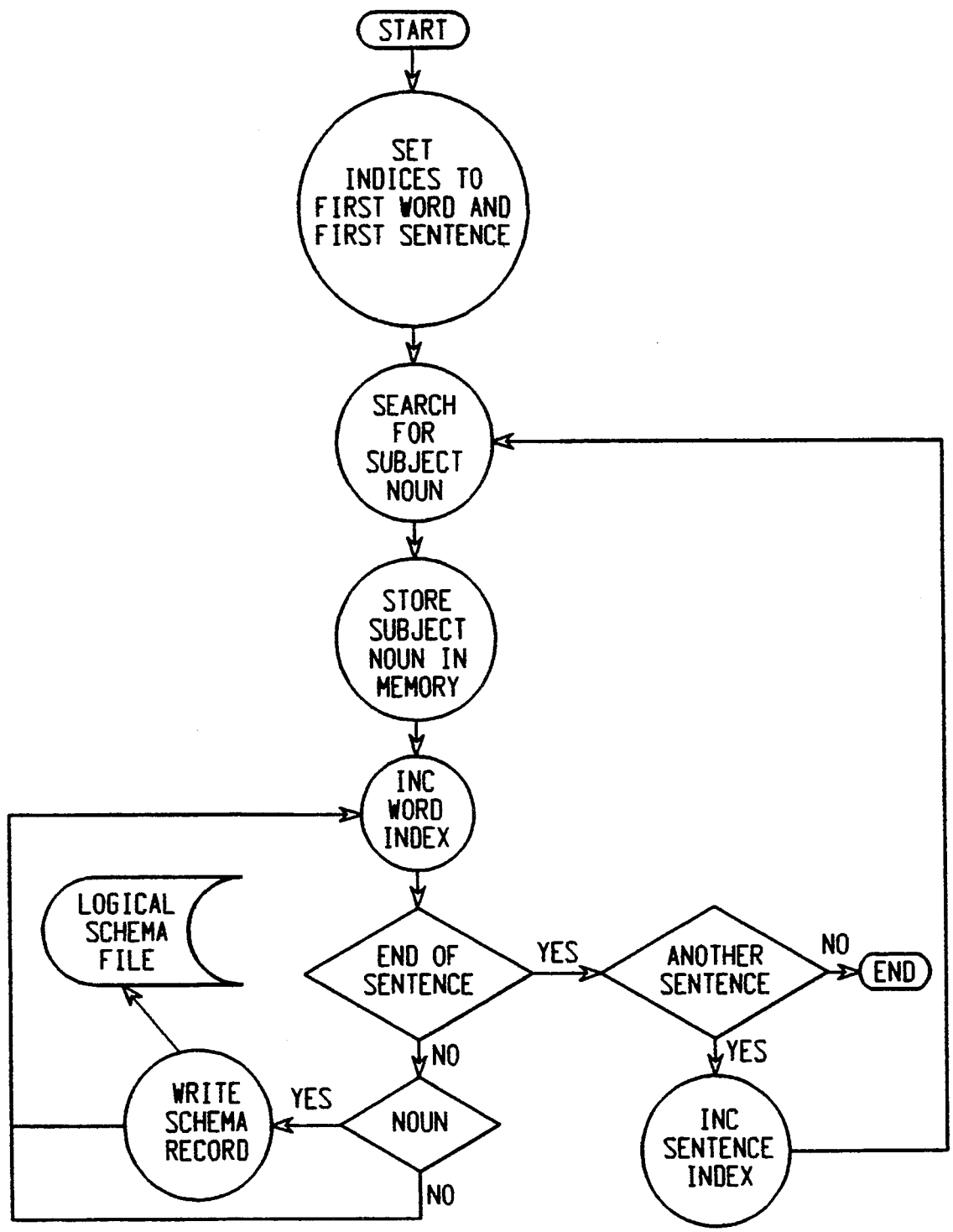
FIG. 16 is a flowchart illustrating the logic involved in generating a logical schema.

FIG. 16 shows the step of generating a logical schema in greater detail. Initially, the parser sets one index to the first sentence in the specification and another index to the first word in the sentence. Next, the parser searches for the subject noun in the sentence. After finding the subject noun, the parser stores the subject noun in its memory. The parser then increments the word index to the next word in the sentence and determines if it is at the end of the sentence. If the parser is not at the end of the sentence, it determines if the current word is a noun. If the current word is not a noun, the parser loops back up and increments the word index to the next word in the sentence. If the current word is a noun, the parser writes a schema record and then loops back up and increments the word index to the next word in the sentence. A schema record includes a number of fields. These fields contain: 1) the entity name, 2) the attribute name, 3) the primary key status key for the attribute, 4) a key indicating if the attribute references another entity (foreign key), 5) the type of the attribute data, and 6) the size of the attribute data. This process is continued until the end of the sentence is reached. After the end of the sentence is reached, the parser determines if there is another sentence in the specification. If there is not another sentence, the logical schema is complete. If there is another sentence, the parser increments the sentence index to the next sentence and loops back up and processes the next sentence. This process is continued until each sentence has been processed and the logical schema is complete.

C. Validator

Figure 17:
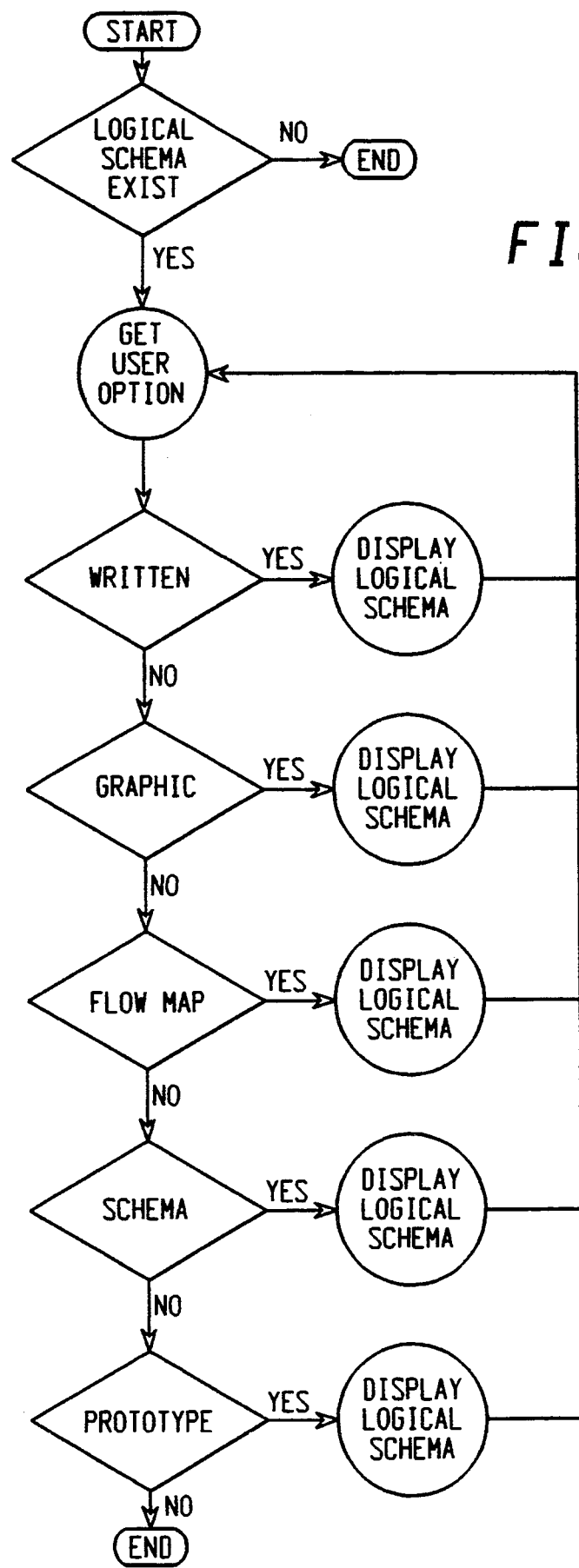
FIG. 17 is a flowchart illustrating the logic of the validator.

The function of the validator is shown in greater detail in FIG. 17. First, the validator determines if a logical schema exists. If a logical schema does not exist, the validator exits. Otherwise, the user has the option of viewing the logical schema in any of five formats. These formats are written, graphic, flow map, schema, and prototype. After the user selects a particular format, the validator displays the logical schema in that format. The validator then loops back up and gives the user the option of viewing the logical schema again in any of the five formats. This process is continued until the user decides to exit.

Examples of the five formats for viewing the logical schema for a hypothetical specification are shown in Charts 1-5, below. The specification contained the following sentences: (1) Patent identified by number has title and filingdate; and (2) Inventor identified by name has patent, address, and telephonenumber.

---

The entity PATENT has 1 each of the following: number, title, filing_date.
The entity PATENT is related to any number of each of the followin entities: inventor.
The entity PATENT is uniquely identified by: number.
The entity INVENTOR has 1 each of the following: name, patent, address, telephone_number.
The entity INVENTOR is uniquely identified by: name.

Chart 1. Written

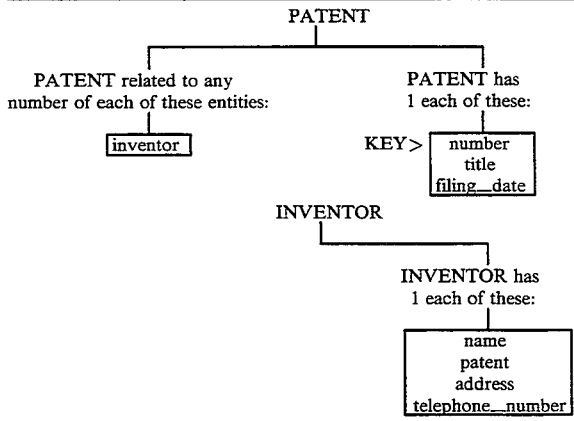

[1]KEY> = unique identifier

Chart 2. Graphic

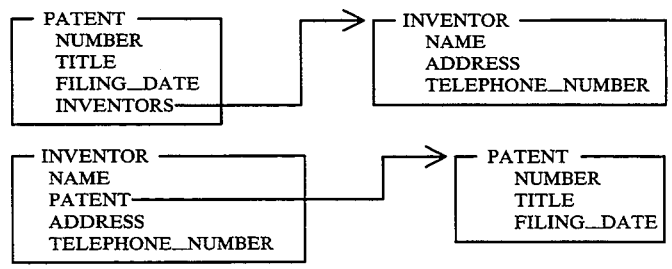

Chart 3. Flow map

ENTITY    (.... ATTRIBUTES ....)
PATENT    (NUMBER, title, filing_date)
INVENTOR  (NAME, Patent—>number, address, telephone_number)
[1]An attribute in UPPER CASE uniquely identifies the entity to its left.
[2]An attribute with —> in the middle references a different -continued entity.
[3] An attribute in lower case is a characteristic of the entity to its left.

Chart 4. Schema

```
*** PATENT RECORD ***
NUMBER          1,234,567
TITLE           ABC Invention
FILING_DATE     1/1/93
*** INVENTOR RECORD ***
NAME            Dr. Smith
PATENT          1,234,567
ADDRESS         100 Main Street
TELEPHONE_NUMBER 657-4485
```

Chart 5. Prototype

D. Code Generator

Figure 18:
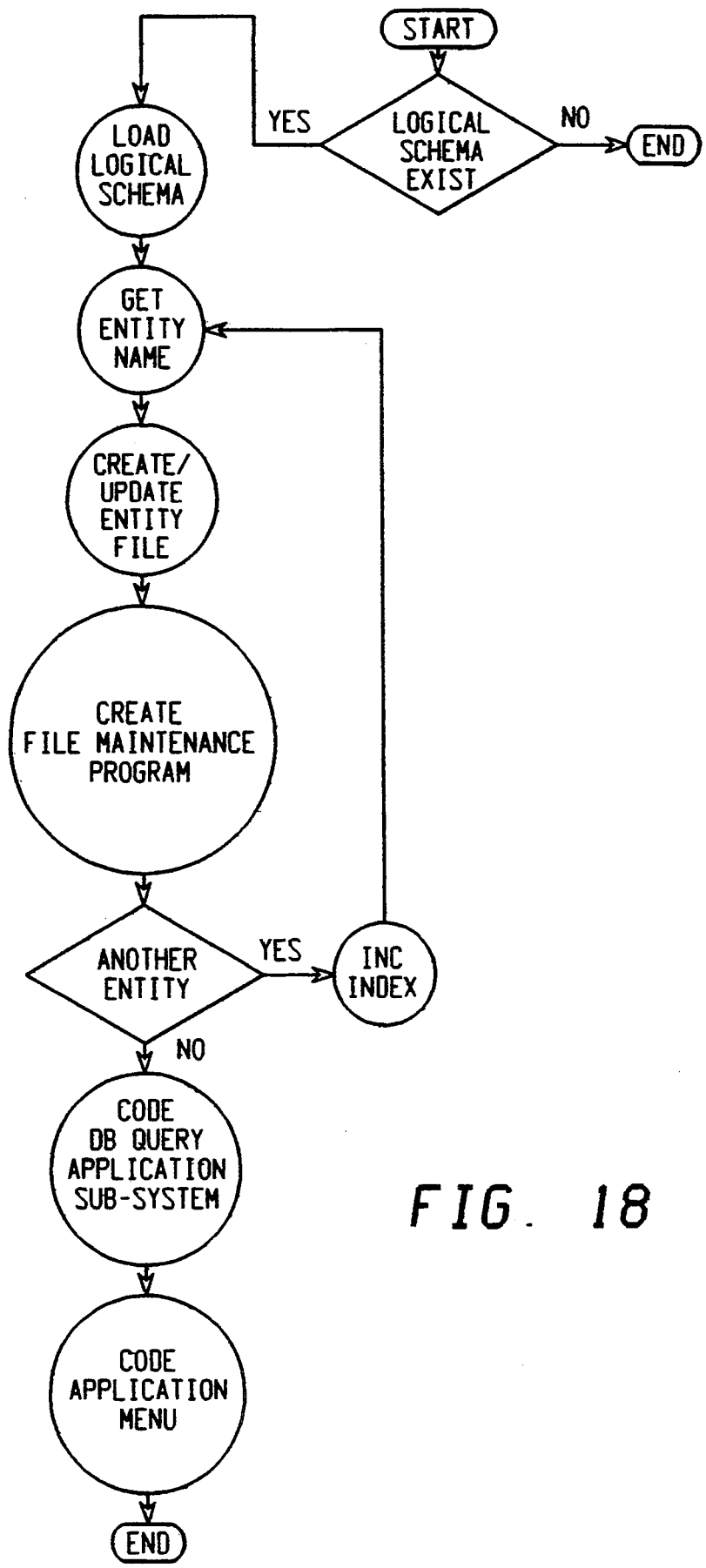
FIG. 18 is a flowchart illustrating the logic of the code generator.

FIG. 18 shows the function of the code generator in greater detail. Initially, the code generator determines if a logical schema exists. If a logical schema does not exist, the code generator exits. Otherwise, the code generator loads the logical schema into the portion of the memory that is allocated to the code generator. Next, the code generator gets the name of the first entity in the logical schema and creates/updates a database file for the entity and creates a file maintenance program for the file. The code generator then determines if there is another entity in the logical schema. If there is another entity, the code generator increments the index to the next entity and loops back up and processes the next entity. This process is continued until each entity has been processed. After the last entity has been processed, the code generator codes a database query application sub-system and an application menu.

1. Load Logical Schema

Figure 19:
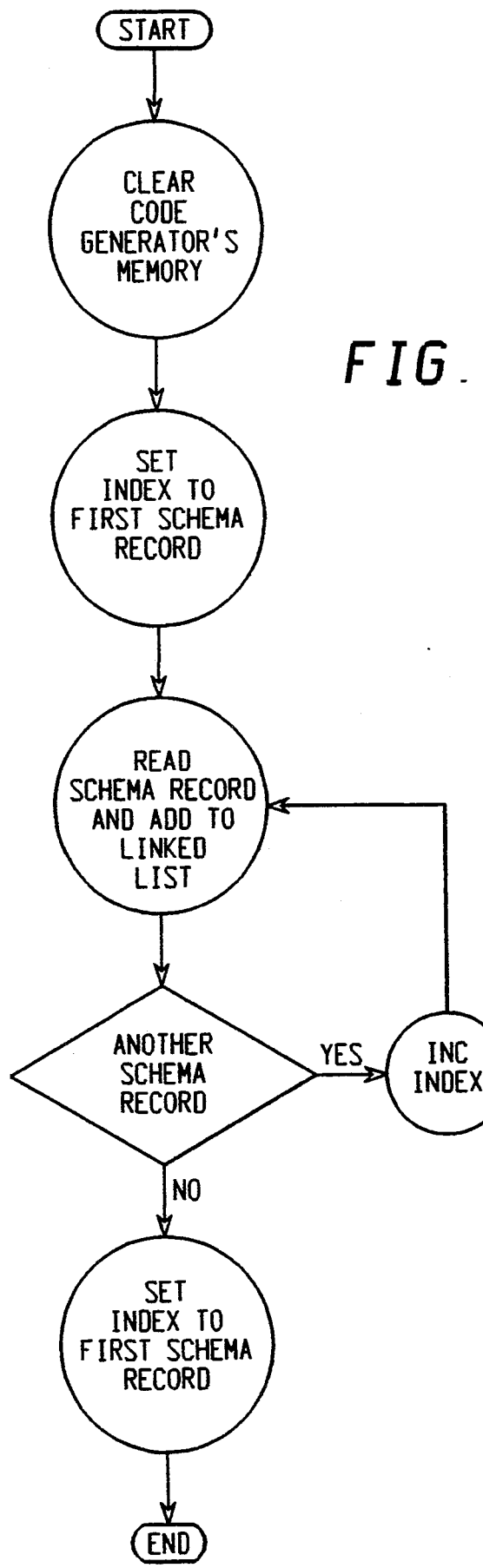
FIG. 19 a flowchart illustrating the logic involved in loading a logical schema into the code generator's memory.

The step of loading a logical schema into the code generator's memory is shown in greater detail in FIG. 19. First, the code generator's memory is cleared. Next, an index is set to the first schema record in the logical schema file and the record is read and added to a linked list. The code generator then determines if there is another schema record in the logical schema file. If there is another schema record, the index is incremented to the next record and the code generator loops back up and reads and adds the next record to the linked list. This process is continued until the last schema record has been read and added to the linked list. Lastly, the code generator sets an index to the first schema record in the linked list.

2. Create/Update Entity File

Figure 20A:
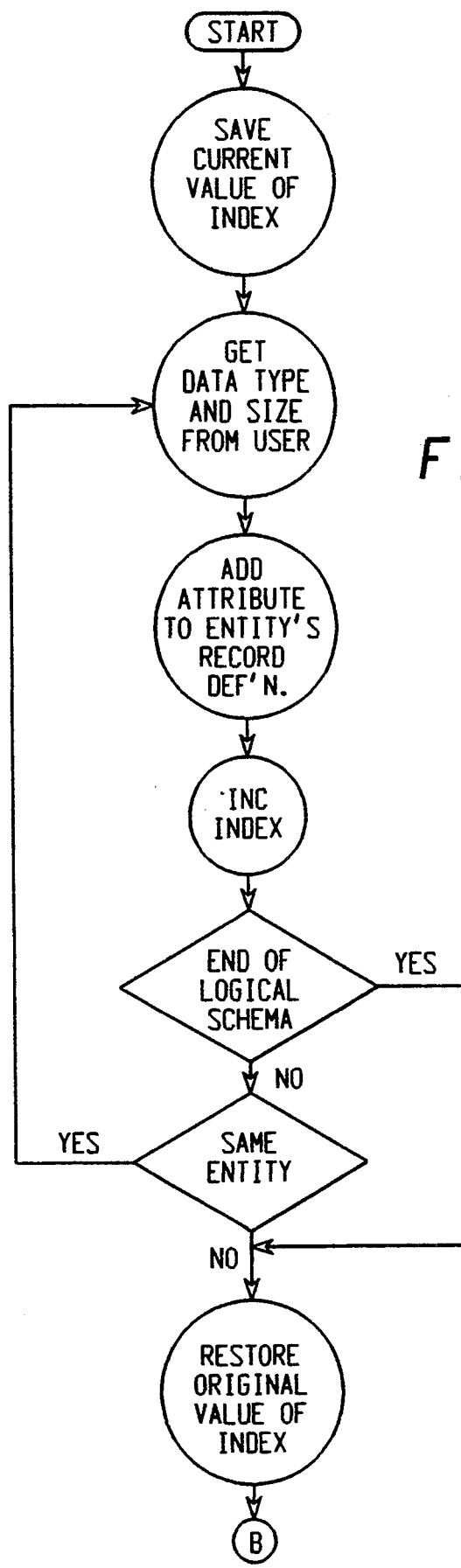
FIGS. 20a and 20b collectively form a flowchart illustrating the logic involved in creating/updating an entity file.
Figure 20B:
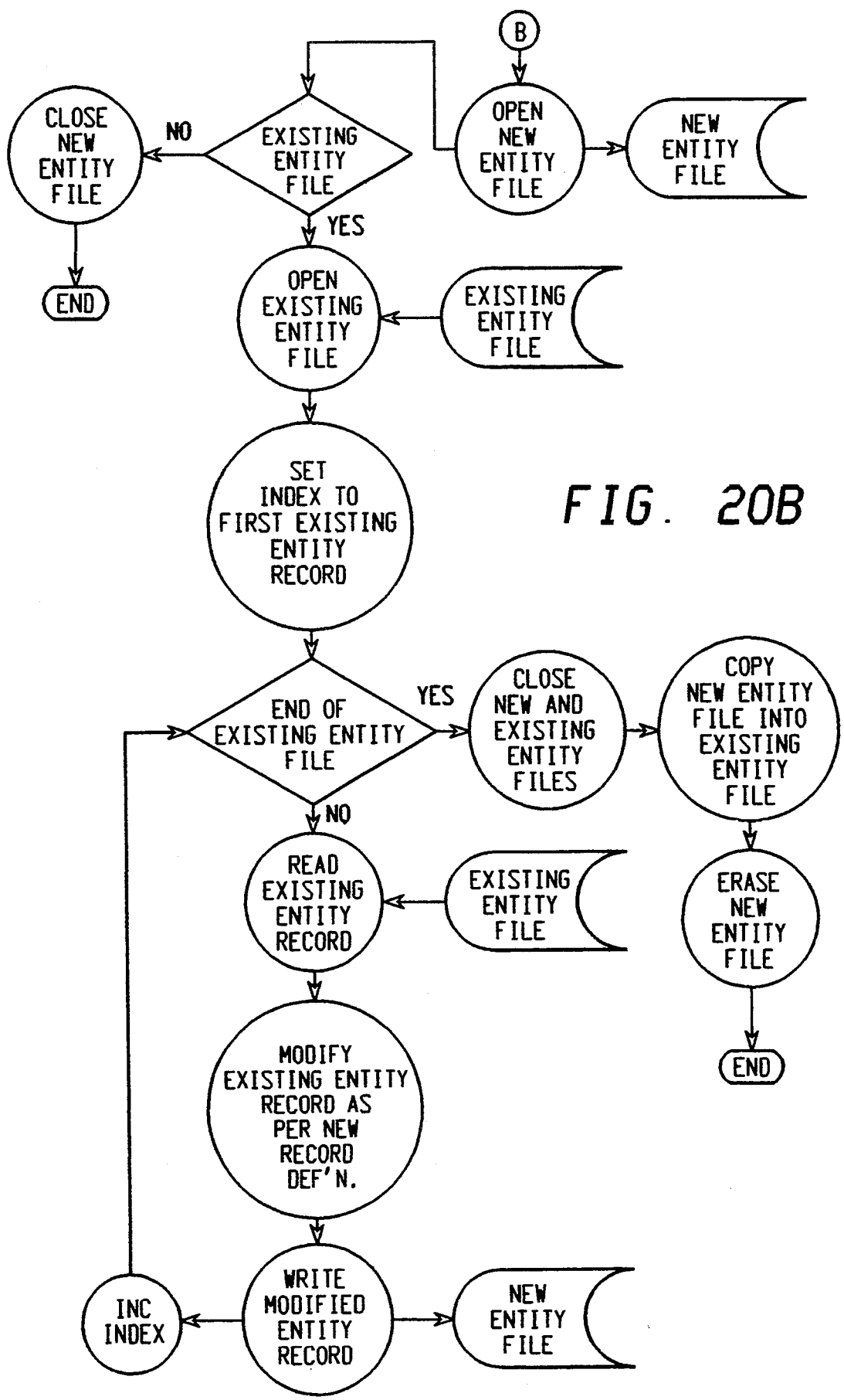

FIGS. 20a and 20b collectively show the step of creating/updating an entity file in greater detail. Initially, the code generator saves the current value of the index and prompts the user to input the first attribute's data type (i.e. character, numeric) and size. Next, the code generator adds the first attribute for the current entity to the entity's record definition and increments the index to the next schema record. A record definition includes all of the attributes for an entity together with the data type and size of each attribute. The code generator then determines if it is at the end of the logical schema and if it is not, if the next schema record is for the same entity. If the code generator is not at the end of the logical schema and the next schema record is for the same entity, it loops back up and processes the next schema record. This process is continued until the end of the logical schema is reached or until the entity changes. In either case, the code generator restores the original value of the index. At this point, the record definition for the current entity is complete.

Next, the code generator opens a new file for the current entity. After opening a new file, the code generator determines if there is an existing file for the current entity. If a file does not already exist, the new file is closed. Otherwise, the existing file is opened. The code generator then sets an index to the first entity record in the existing file and determines if it is at the end of the existing file. If the code generator is not at the end of the file, it reads the existing entity record, modifies the existing record in accordance with the new record definition, and writes the modified entity record to the new file. The index is then incremented to the next entity record in the existing file and the code generator loops back up and determines if it is at the end of the existing file. If the code generator is not at the end of the file, it processes the next existing entity record. This process is continued until the code generator is at the end of the existing file. After the end of the existing file is reached, the code generator closes the new file, copies the new file into the existing file, and erases the new file.

3. Create File Maintenance Program

Figure 21:
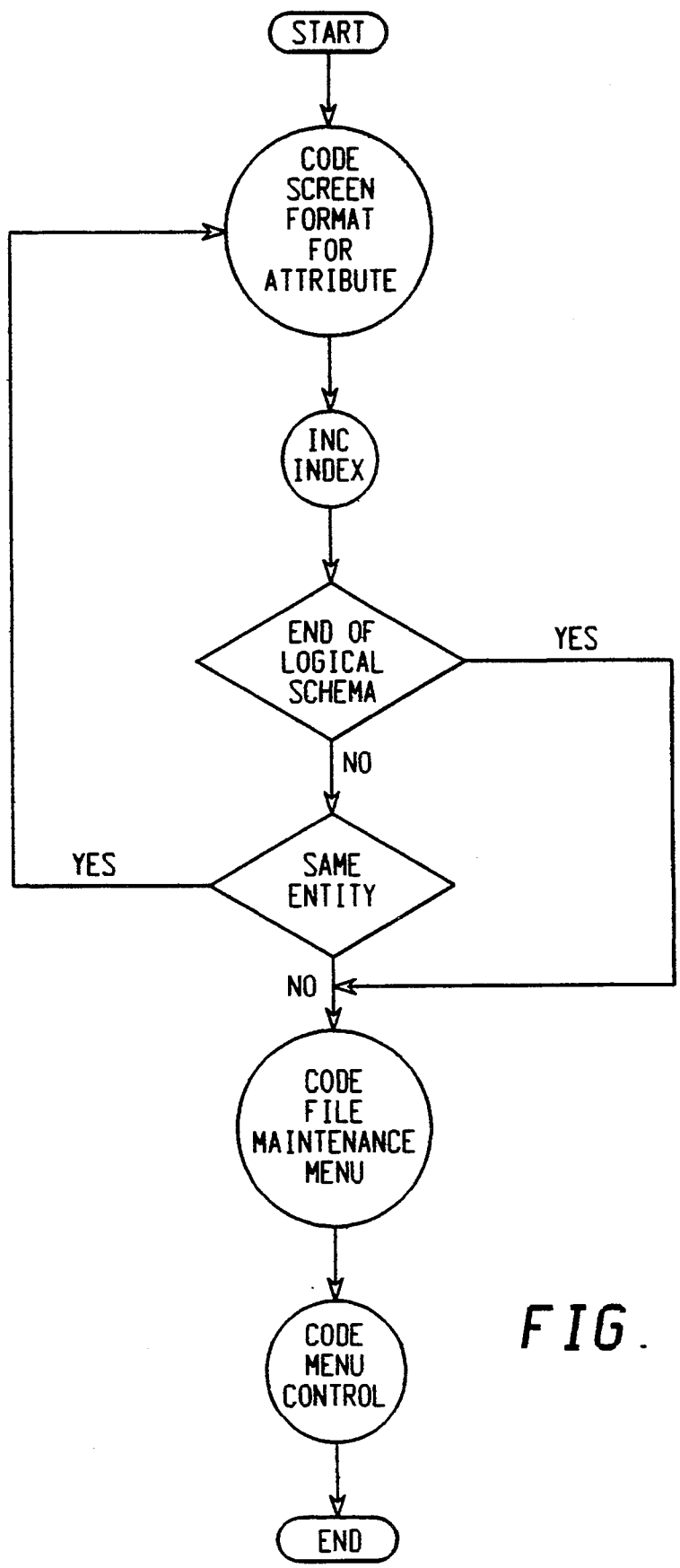
FIG. 21 is a flowchart illustrating the logic involved in creating a file maintenance program.

The step of creating a file maintenance program is shown in greater detail in FIG. 21. First, the code generator codes the screen format for the first attribute of the current entity and increments the index to the next attribute. Next, the code generator determines if it is at the end of the logical schema and if it is not, if the next schema record is for the same entity. If the code generator is not at the end of the logical schema and the next schema record is for the same entity, it loops back up and codes the screen format for the next attribute of the current entity. This process is continued until the end of the logical schema is reached or until the entity changes. In either case, the code generator codes the file maintenance menu. In the preferred embodiment, the file maintenance menu is as shown in Chart 6, below.

Chart 6. File Maintenance Menu

1. Add record
2. Delete record
3. Change record
4. Quit

The code generator then codes the file maintenance menu control. The code for the file maintenance menu control will prompt the user to input a desired action from the file maintenance menu and will perform the action selected by the user, namely, add a record, delete a record, change a record, or quit.

4. Code Database Query Application Sub-System

Figure 22:
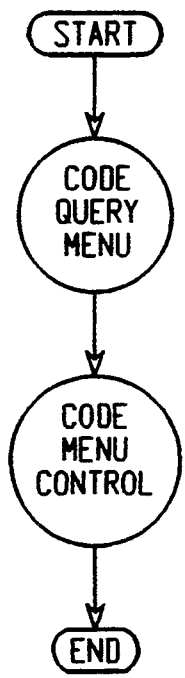
FIG. 22 is a flowchart illustrating the logic involved in coding a database query application sub-system.

FIG. 22 shows the step of coding a database query application sub-system in greater detail. Initially, the code generator codes the query menu. In the preferred embodiment, the query menu is as shown in Chart 7, below.

| Chart 7. Query Menu | |
|---|---|
| 1. | Query Entity 1 |
| 2. | Query Entity 2 |
| ... | |
| N. | Query Entity N |
| N+1. | Quit |

Next, the code generator codes the query menu control. The code for the query menu control will prompt the user to input a desired action from the query menu and will perform the action selected by the user. For example, if the user selects query entity x, the code will return the results of a query for entity x. Otherwise, the user can select quit and the code will exit the query application sub-system.

a. Execute Database Query Application Sub-System Code

Figure 23:
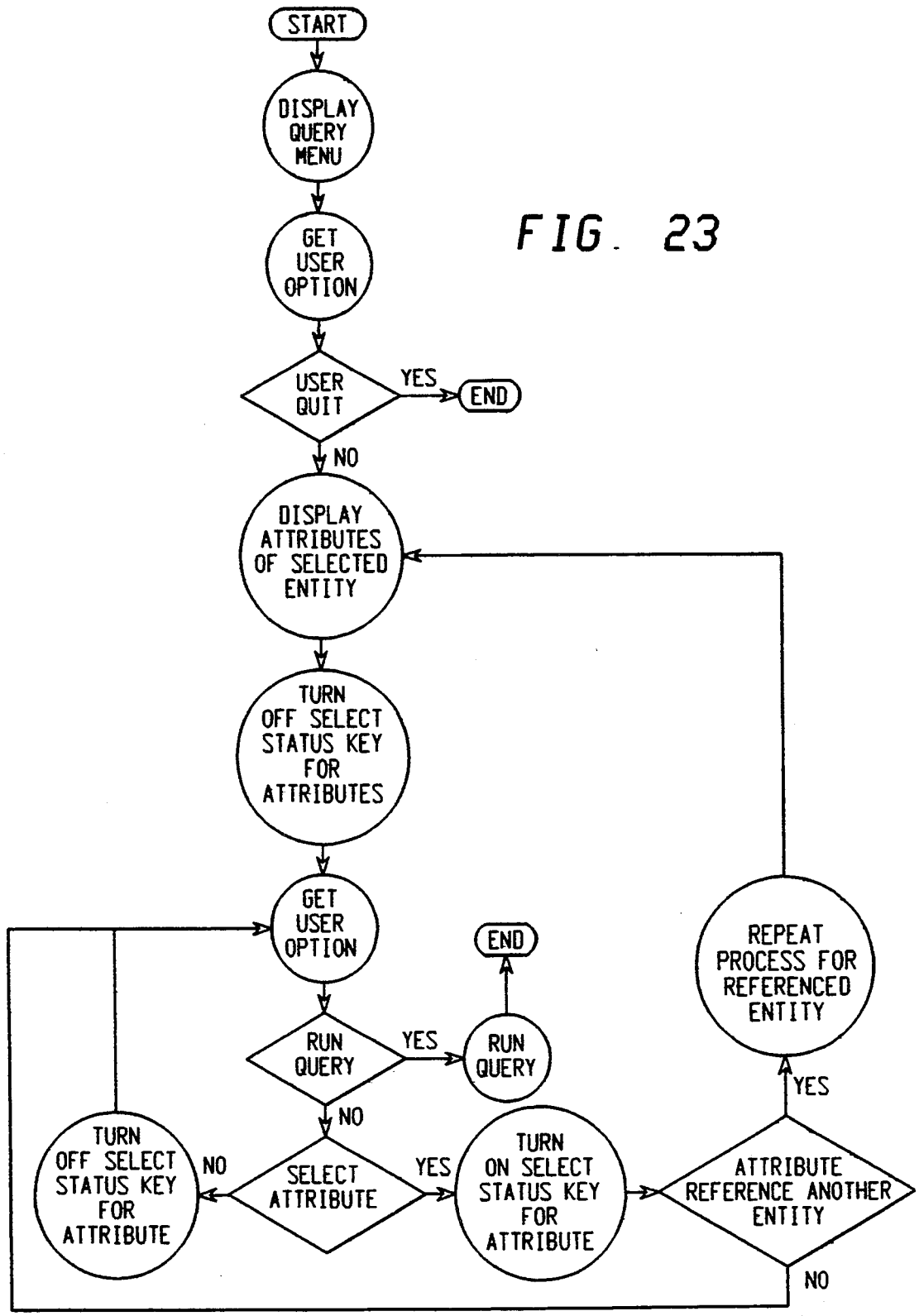
FIG. 23 is a flowchart illustrating the execution of the database query application sub-system code.

The execution of the database query application sub-system code is shown in greater detail in FIG. 23. First, the code displays the query menu which lists all of the entities in the database to query and the quit option. Next, the user has the option of querying an entity or quitting. If the user decides to quit, the code exits. Otherwise, if the user selects an entity to query, the code displays all of the attributes of the selected entity and turns off the select status key for each of the attributes. The user then has the option of running the query, selecting an attribute for inclusion in the query, and removing an attribute from the query. If the user decides to run the query, the code runs the query, returns the result of the query to the user, and exits. If the user decides to select an attribute for inclusion in the query, the code turns on the select status key for the selected attribute and then determines if the attribute references another entity. If the selected attribute references another entity, the code loops back up and repeats the above process for the referenced entity. If the selected attribute does not reference another entity, the code loops back up to get the user's next option. Lastly, if the user decides to remove an attribute from the query, the code turns off the select status key for the attribute and loops back up to get the user's next option. This process is continued until the user runs the query.

b. Execute Run Query Code

Figure 24:
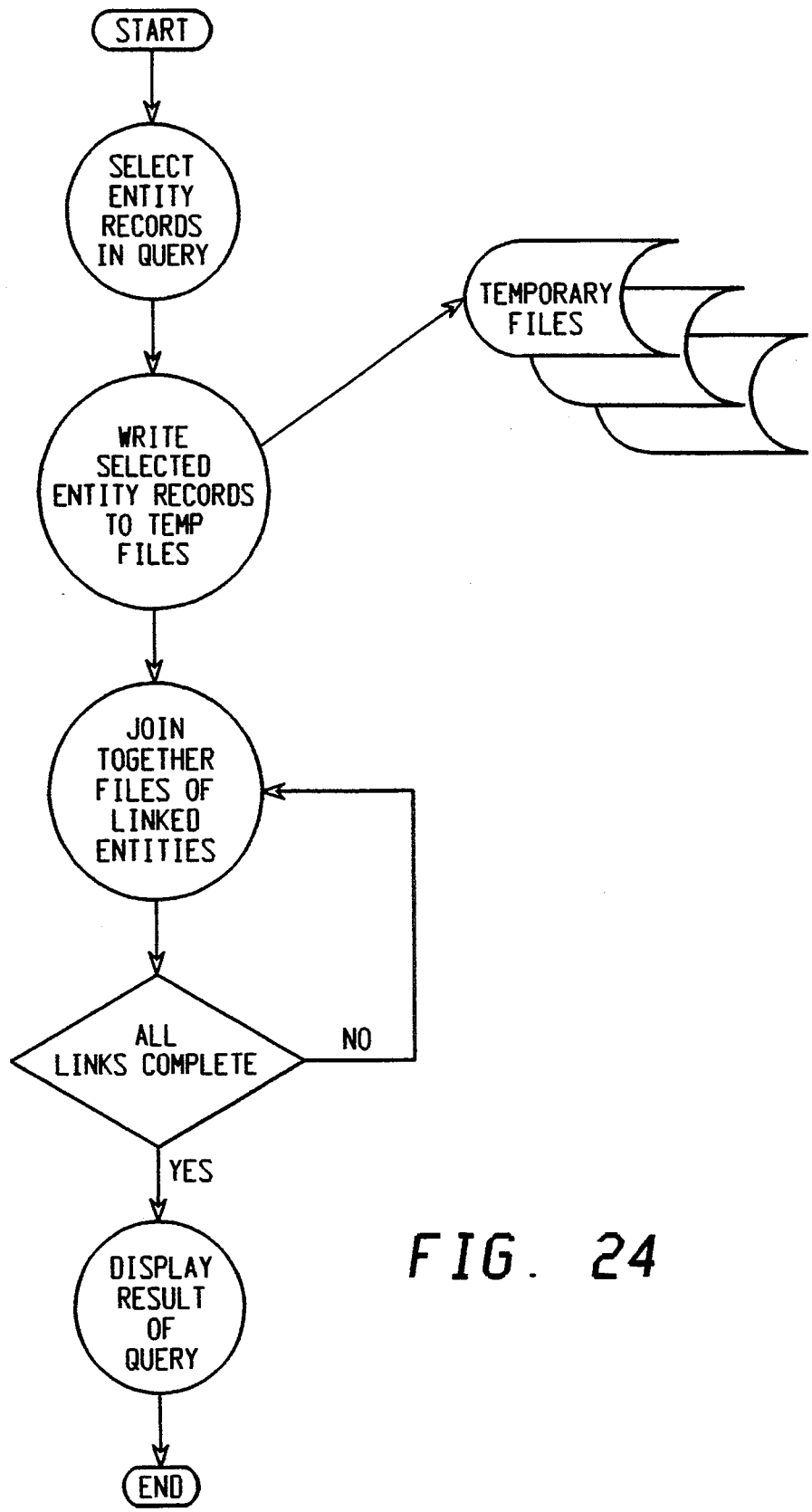
FIG. 24 is a flowchart illustrating the execution of the run query code.

FIG. 24 shows the step of executing the run query code in greater detail. Initially, the code selects the entity records that contain the attributes selected for the query and writes each selected record to a temporary file. Next, the code joins together the temporary files of a pair of linked entities and determines if all of the links are complete. All of the links are complete when only one temporary file remains. If all of the links are not complete, the code loops back up and joins together the temporary files of another pair of linked entities. This process is continued until all of the links are complete. After all of the links are complete, the code displays the remaining file which contains the result of the query.

5. Code Application Menu

Figure 25:
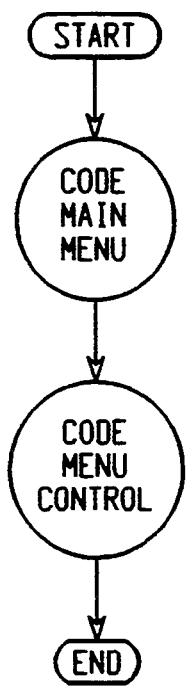
FIG. 25 is a flowchart illustrating the logic involved in coding an application menu.

The step of coding an application menu is shown in greater detail in FIG. 25. First, the code generator codes the main menu. In the preferred embodiment, the main menu is as shown in Chart 8, below.

| Chart 8. Main Menu |
|---|
| 1. Data maintenance |
| 2. Database query application sub-system |
| 3. Quit |

Next, the code generator codes the main menu control. The code for the main menu control will prompt the user to input a desired action from the main menu and will perform the action selected by the user. For example, if the user selects data maintenance, the code will display a menu which lists all of the files that the user can select. Selection of a particular file will activate the corresponding file maintenance program for that file. Likewise, if the user selects database query application sub-system, the code will activate the database query application sub-system. Lastly, if the user selects quit, the code will exit the application system.

The software component of the system of the present invention has been implemented in Turbo Pascal version 6.0, Turbo Pascal version 5.0, and Turbo Prolog version 2.0. The preferred language is Turbo Pascal version 6.0. However, the software component of the system could be implemented in any programming language. The system itself could be any suitable machine, such as an IBM ® PC compatible machine, with an 80286 or higher level (e.g., 80386 or 80486) processor that operates at a speed of 12 MHz. (The machine could operate at a lower speed but it would be less powerful.) In the preferred embodiment, the disk space required for the system is a minimum of 360K of non-volatile memory and 200K of volatile memory. The non-volatile memory could be either a hard disk or a floppy disk, but a hard disk is preferred. The preferred operating system is DOS version 2.0 or higher. Finally, the display device could be either color or monochrome, but color is preferred.

One may now appreciate that the present invention provides end users with a system for automatically programming a functional database from a string of natural language words which form a substantially grammatically complete sentence. Consequently, the end user need not have any training or experience as a system analyst or a programmer.

Although the present invention has been shown and described with respect to a preferred embodiment, it is obvious that equivalent alterations and modifications will occur to others skilled in the art upon the reading and understanding of this specification. For example, the system of the present invention has been described with reference to the English language where the descriptive noun follows the verb. However, the concepts of the system could be applied to any language with appropriate modifications being made to reflect the expected order of the words in the particular language. Additionally, while the system of the present invention has been described generically without reference to any particular DBMS, the database and the related programs could be coded in any DBMS (e.g., Paradox, dbase). The present invention includes all such equivalent alterations and modifications and is limited only by the scope of the following claims.

What is claimed is:

1. A system for automatically creating a relational database from a string of words, the string of words forming a substantially grammatically complete sentence in which the words have a certain relationship to one another, the string of words including a subject noun, a verb, and at least one descriptive noun following the verb, said system comprising:
  a terminal which receives input data from a user and displays output data to the user; and
  a processing unit which processes the data input by the user and generates the data to be output to the user, said processing unit comprising:
   an editor which inputs a string of words from a user at said terminal and displays it to the user at said terminal;
   a parser which receives the inputted string of words from said editor, determines if the string of words includes a subject noun, a verb, and at least one descriptive noun following the verb, analyzes the string of words to determine the relationship among the words, and generates a logical schema; and
   a database generator which receives the generated logical schema from said parser and programs a database containing a file and at least one field linked together in accordance with the logical schema.

2. The system as defined in claim 1 wherein said parser determines the part of speech of each word in the string of words.

3. The system as defined in claim 2 wherein said parser includes a memory containing a dictionary and wherein said parser looks up each word in the string of words in the dictionary to determine the part of speech of the word.

4. The system as defined in claim 3 wherein said parser prompts the user to input the part of speech of each word that is unlisted in the dictionary.

5. The system as defined in claim 4 wherein said parser adds the unlisted word and its inputted part of speech to the dictionary.

6. The system as defined in claim 1 wherein said parser determines the plurality of the subject noun and each descriptive noun.

7. The system as defined in claim 6 wherein said parser determines the proper relationship among a plural subject noun and plural descriptive nouns.

8. The system as defined in claim 1 wherein said database generator creates a file for the subject noun.

9. The system as defined in claim 8 wherein said database generator creates a field in the file for each descriptive noun.

10. The system as defined in claim 1 wherein there is a plurality of strings of words.

11. The system as defined in claim 10 wherein said parser determines the end of each string of words.

12. The system as defined in claim 11 wherein said parser determines if each string of words includes a subject noun, a verb, and at least one descriptive noun following the verb.

13. The system as defined in claim 12 wherein said database generator creates a file for each subject noun.

14. The system as defined in claim 13 wherein said database generator creates a field in the related file for each descriptive noun.

15. The system as defined in claim 1 further comprising a database validator which receives the generated logical schema from the parser and allows the user to determine if the logical schema is correct.

16. The system as defined in claim 1 wherein said terminal includes a keyboard and a display device, both connected to said processing unit, wherein said keyboard receives the input data from the user and said display device displays the output data to the user.

17. The system as defined in claim 16 wherein said processing unit comprises a processor and a memory connected to said processor, wherein said editor, said parser, and said database generator are stored in said memory and are executed in said processor.

18. A system for automatically creating a relational database from a string of words, the string of words forming a substantially grammatically complete sentence in which the words have a certain relationship to one another, the string of words including a subject noun, a verb, and at least one descriptive noun, said system comprising:
  a terminal which receives input data from a user and displays output data to the user; and
  a processing unit which processes the data input by the user and generates the data to be output to the user, said processing unit comprising:
   an editor which inputs a string of words from a user at said terminal and displays it to the user at said terminal;
   a parser which receives the inputted string of words from said editor, determines if the string of words includes a subject noun, a verb, and at least one descriptive noun, analyzes the string of words to determine the relationship among the words, and generates a logical schema; and
   a database generator which receives the generated logical schema from said parser and programs a database containing a file and at least one field linked together in accordance with the logical schema.

19. The system as defined in claim 18, wherein the editor inputs a plurality of strings of words, the parser (i) determines the end of each string of words, (ii) determines if each string of words includes a subject noun, a verb and at least one descriptive noun following the verb, (iii) analyzes each string of words to determine the relationship between the words, and (iv) generates the logical schema from the plurality of strings of words.

20. The system as defined in claim 1, wherein the editor inputs a plurality of strings of words, the parser (i) determines the end of each string of words, (ii) determines if each string of words includes a subject noun, a verb and at least one descriptive noun following the verb, (iii) analyzes each string of words to determine the relationship between the words, and (iv) generates the logical schema from the plurality of strings of words.

21. A system for automatically creating a relational database from a plurality of strings of words, each of the strings of words forming a substantially grammatically complete sentence in which the words have a certain relationship to one another, each of the strings of words including a subject noun, a verb, and at least one descriptive noun following the verb, said system comprising:
  a terminal which receives as input said strings of words from a user and displays output data to the user; and
  a processing unit which processes the input strings of words by the user and generates the data to be output to the user, said processing unit comprising:

an editor which inputs the strings of words from a user at said terminal and displays each of the strings of words to the user at said terminal;

a parser which receives the inputted strings of words from said editor, determines if each of the strings of words includes a subject noun, a verb, and at least one descriptive noun following the verb, analyzes each of the strings of words to determine the relationships among the words, and generates a logical schema by writing a logical schema file with one or more schema records containing information about all subject nouns, and all descriptive nouns and relationships between subject nouns; and a database generator which receives the generated logical schema from said parser and programs a database with a data structure in accordance with the logical schema, said database including at least one file with an associated record definition, each record definition containing a number of fields, and certain fields being linked in accordance with the logical schema.

22. A system as defined in claim 21, further including a validator which provides a user with an option to select a format and to view the logical schema in the selected format before said database generator programs said database in accordance with the logical schema.

* * * * *